United States Patent
Corl

(10) Patent No.: US 11,924,260 B2
(45) Date of Patent: Mar. 5, 2024

(54) SECURE TELEVISION DISTRIBUTION OVER HETEROGENEOUS NETWORKS

(71) Applicant: Triveni Digital Inc., Princeton, NJ (US)

(72) Inventor: Mark T. Corl, Monroe Township, NJ (US)

(73) Assignee: Triveni Digital Inc., Princeton, NJ (US)

( * ) Notice: Subject to any disclaimer, the term of this patent is extended or adjusted under 35 U.S.C. 154(b) by 148 days.

(21) Appl. No.: 17/367,459

(22) Filed: Jul. 5, 2021

(65) Prior Publication Data
US 2022/0014575 A1     Jan. 13, 2022

Related U.S. Application Data

(60) Provisional application No. 63/049,652, filed on Jul. 9, 2020.

(51) Int. Cl.
| | |
|---|---|
| *G06F 15/16* | (2006.01) |
| *H04L 9/40* | (2022.01) |
| *H04L 12/66* | (2006.01) |
| *H04L 65/611* | (2022.01) |
| *H04L 65/65* | (2022.01) |

(52) U.S. Cl.
CPC ............ *H04L 65/611* (2022.05); *H04L 12/66* (2013.01); *H04L 63/0442* (2013.01); *H04L 65/65* (2022.05)

(58) Field of Classification Search
CPC ....... H04L 65/611; H04L 65/65; H04L 12/66; H04L 63/0442
USPC .......................................................... 709/231
See application file for complete search history.

(56) References Cited

U.S. PATENT DOCUMENTS

| | | | | |
|---|---|---|---|---|
| 2009/0177585 | A1* | 7/2009 | Eskicioglu | ........... H04N 21/454 380/255 |
| 2010/0107206 | A1* | 4/2010 | White | ................... H04L 65/611 725/109 |
| 2019/0313137 | A1* | 10/2019 | Bui Do | ............... H04L 65/1069 |

(Continued)

OTHER PUBLICATIONS

ATSC: "A/53: ATSC Digital Television Standard, Parts 1-6, 2007," Advanced Television Systems Committee, Jan. 3, 2007.
(Continued)

*Primary Examiner* — Alan S Chou
(74) *Attorney, Agent, or Firm* — David Todd Shoneman; Michael A. Pugel

(57) ABSTRACT

A method and system of providing a second broadcast signal from a first broadcast signal is described. The method includes receiving a broadcast signal containing media content and data content and selecting, from the data content, a first portion containing control and configuration and a second portion containing replacement content. The method further includes converting the first portion and the second portion into a multicast internet protocol stream and processing the replacement content as a second broadcast signal using the control and configuration information. The system includes a transceiver that receives a broadcast signal, selects a first portion and a second portion of the data content, and converts the first portion of the data content and the second portion of the data content into a multicast internet protocol stream. The system further includes a gateway device that processes the replacement content using the control and configuration information.

20 Claims, 9 Drawing Sheets

(56) References Cited

U.S. PATENT DOCUMENTS

| | | | | |
|---|---|---|---|---|
| 2020/0128055 A1* | 4/2020 | Marie | ................... | H04L 65/765 |
| 2020/0336572 A1* | 10/2020 | Kwon | .................... | H04L 12/66 |
| 2021/0143938 A1* | 5/2021 | Kwak | ................ | H04N 21/2383 |

OTHER PUBLICATIONS

ATSC: "ATSC 3.0 System," Doc. A/300:2020, Advanced Television Systems Committee, Apr. 2020.

ATSC: "ATSC Standard: Link-Layer Protocol (A/330)," Doc. A/330:2019, Advanced Television Systems Committee, Washington, D.C., May 3, 2019.

ATSC: "ATSC Standard: Signaling, Delivery, Synchronization, and Error Protection (A/331)," Doc. A/331:2020, Advanced Television Systems Committee, Jan. 16, 2020.

ATSC: "ATSC Candidate Standard: Revision to A/324:2018, Scheduler / Studio to Transmitter Link," Doc. S32-266r56, Advanced Television Systems Committee, Jan. 7, 2020.

Zhang et al., "Wireless In-Band Distribution Link using LDM for SFN Transmitters and Gapfillers in ATSC 3.0," 2018 EEE Broadcast Symposium (BTS), Arlington, VA, 2018, pp. 1-5.

sMPTE: "Forward Error Correction for Real-Time Video/Audio Transport Over IP Networks," Doc. SMPTE ST 2022-1-2007, Society of Motion Picture and Television Engineers, White Plains, NY, 2007.

Y. Wu et al., "ATSC 3.0 Backward Compatible SFN In-Band Distribution Link and In-Band Inter-Tower Communications Network for Backhaul, IoT and Datacasting" ATSC Progress Report, IDL-ITC Full, May 2020.

* cited by examiner

SECURE TELEVISION DISTRIBUTION OVER HETEROGENEOUS NETWORKS

CROSS-REFERENCE TO RELATED APPLICATION

This application claims the benefit, under 35 U.S.C. § 119(e), of U.S. Provisional patent application Ser. No. 63/049,652, filed on Jul. 9, 2020, which is incorporated herein in its entirety.

TECHNICAL FIELD

The present disclosure generally relates to broadcast communications and more specifically to securely distributing television broadcast signals over heterogeneous networks.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure.

The advent of advanced broadcast signal transmission standards, such as the Advanced Television Systems committee (ATSC) 3.0 set of standards, and the corresponding secure transmission technologies makes manipulation of the data streams difficult across state-wide distribution networks. Metadata and other information cannot be changed without being re-signed. This is problematic when the re-signing equipment is in an unattended site with less security than is available at the main studio. Further, providing regionalized services requires duplicating the entire broadcast data feed which is either impossible or very costly from a bandwidth perspective. In addition, some transmitters are not connected to a physical network and receive the data for their broadcast from a sister transmitter. In these cases, a mechanism to send control information over a broadcast communications network is required.

Many television distribution networks rely on a variety of technologies to move the data that will ultimately constitute the television broadcast from the origination point, typically the main studio, to the transmission antenna. These technologies include fiber and copper internet protocol (IP)-based networks, microwave, and even other television broadcasts. In some cases, a retransmission is necessary because the identifying metadata within the broadcast must change, for example, when a new frequency and call letters are required. Each distribution technology has advantages and disadvantages over the other and, frequently in practice, the technologies may be combined to provide redundancy. For example, a fiber network is highly efficient and full duplex, so it offers the highest bandwidth and best control for distribution since equipment at both ends can be managed with equal ease. However, a fiber network can be physically compromised so an over-the-air microwave or broadcast can provide a lower bandwidth backup to continue supporting essential but perhaps degraded services in a one-way communication mode.

The ATSC 3.0 standard defined in document A/300:2020 is a secure, over-the-air (OTA) broadcast system based on IP transport. The metadata within this system are cryptographically signed and cannot be changed without re-signing, thereby rendering it effectively immutable. This is not the case for the original North American digital broadcast system, so-called ATSC 1.0, defined in document ATSC A/53, that has no such security and is susceptible to man-in-the-middle attacks. ATSC 1.0 networks could leverage the lack of security by sending a single content stream throughout the network and changing the metadata to rebrand the transmission just prior to transmission. While this is technically possible with ATSC 3.0, changing the metadata requires re-signing which, in turn, requires private keys used to sign the entire broadcast to reside at or near the, usually unattended, transmission site which may compromise security.

The Federal Communication Commission (FCC) allows single-sourced networks to announce the primary call letters and then occasionally announce a list of the various retransmission call letters and frequencies. For some networks, this is sufficient, but it can cause confusion and does not easily support regionalization.

Note that the ability to change only the metadata is based on the reality that the same or similar content is being distributed across the network. The prime example is in public broadcasting state networks such as those deployed by Public Broadcasting Service (PBS) North Carolina (formerly UNC-TV) and Nebraska Educational TV (NET). The content is sourced in a single location and distributed across the state using a variety of technologies as described above. There may be situations that warrant different content for different regions, but this is the exception rather than the rule.

Certainly, a way to alleviate the immutable metadata problem is to generate separate streams with the correct metadata for each transmission at a central location. For star networks or high bandwidth networks, this is feasible though the equipment costs could be prohibitive. Cloud-based solutions are also possible but require a relatively high-speed and high-availability Internet connection at each site. For low bandwidth, ring or daisy chained (multiple hop) networks, this is highly inefficient and may not even be feasible. Most of the networks deployed to date are not star networks and even those that are, have additional "hops", such as radio frequency (RF) translators, that are not conducive to sending multiple versions of a broadcast stream. Even in the best-case bandwidth scenario, there are still situations where a way to send the same data to multiple sites with limited overhead is beneficial. As a result, there is a need to have a system, method and apparatus that can seamlessly, efficiently, and securely provide customized television content to a plurality of broadcast signal transmission facilities in a plurality of content distribution network configurations.

SUMMARY

According to one implementation, a method of providing a second broadcast signal from a first broadcast signal is described. The method includes receiving a first broadcast signal containing media content and data content and selecting a first portion of the data content and a second portion of the data content from the received first broadcast signal, the first portion containing control and configuration information and the second portion containing replacement content. The method further includes converting the first portion of the data content and the second portion of the data content into a multicast internet protocol stream. The method also includes processing the replacement content as a second broadcast signal using the control and configuration information contained in the first portion.

According to another implementation, a system is described. The system includes a transceiver that receives a first broadcast signal containing media content and data content. The transceiver further selects a first portion of the data content and a second portion of the data content, wherein the first portion contains control and configuration information, and the second portion contains replacement content. The transceiver additionally converts the first portion of the data content and the second portion of the data content into a multicast internet protocol stream. The system further includes a gateway device coupled to the transceiver. The gateway device processes the replacement content as a second broadcast signal using the control and configuration information contained in the first portion.

According to another implementation, a method of providing localized emergency alert information is described. The method includes receiving a first broadcast signal containing media content and data content and selecting a first portion of the data content and a second portion of the data content from the received first broadcast signal, the first portion containing control and configuration information and the second portion containing localized emergency alert information for a specific geographic region. The method further includes converting the first portion of the data content and the second portion of the data content into a multicast internet protocol stream. The method also includes processing the localized emergency alert information as a second broadcast signal using the control and configuration information contained in the first portion.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable.

DETAILED DESCRIPTION

Figure 1:
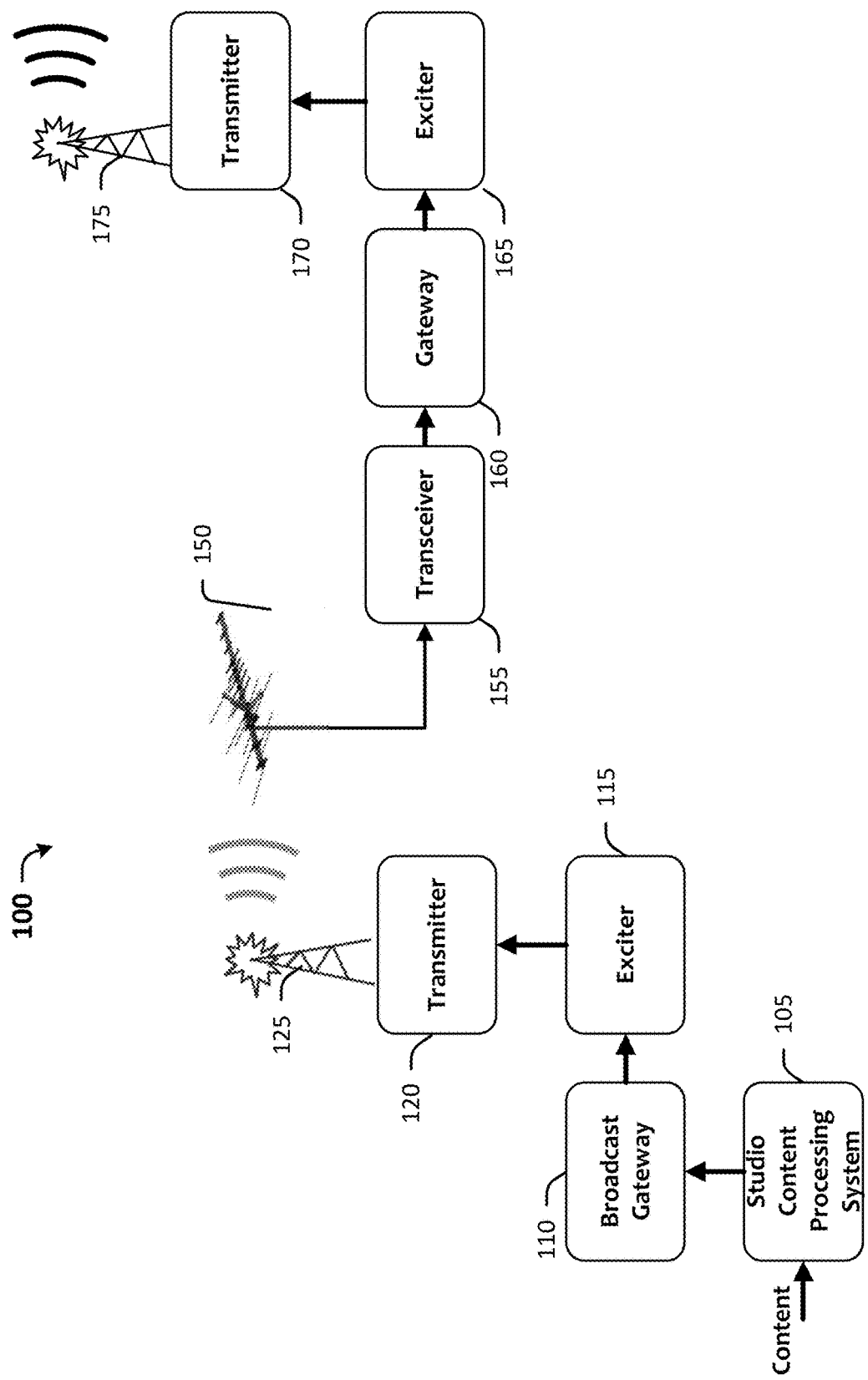
FIG. 1 is a block diagram of an exemplary broadcast content distribution system according to aspects of the present disclosure.

It should be understood that the elements shown in the figures may be implemented in various forms of hardware, software, or combinations on one or more appropriately programmed general-purpose devices, which may include a processor, memory, and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

As used herein, the term "processor" broadly refers to and is not limited to a single- or multi-core general purpose processor, a special purpose processor, a processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. As used herein, the terms "transaction" and "electronic transaction" broadly refer to any transaction which may be electronically validated by the recited system, method, and apparatus.

One or more of the aspects of the embodiments described above may be implemented using application-specific hardware. Further, one or more aspects of the embodiments may be implemented using one or more processing elements, such as central processing units (CPUs) that may include specific operating instructions embedded as firmware in the processing element(s) or may operate from software code that is downloaded into the elements from one or more memory units coupled to the processing element(s).

The present disclosure addresses issues related to the customizable delivery of content and/or data to specific geographic areas within a broadcast system that includes a plurality of over the air broadcast transmission facilities covering those geographic areas. The issues arise in part due to increased concern over the security of the content contained within the broadcast signal. Many modern broadcast signal transmission standards include specific security protocols that attempt to minimize the threat of unauthorized access to the broadcast signal as it passes either through a broadcast transmission facility or as it is communicated between broadcast transmission facilities. The increased level of security limits the ability to customize a broadcast signal for a specific geographic area without providing a separate broadcast signal to each broadcast transmission facility. Such an approach is both impractical and costly.

The embodiments of the present disclosure relate to distribution of content and between different transmission facilities in a heterogeneous broadcast content distribution system. The document takes advantage of the use of the multiple signaling layers in the most modern broadcast transmission standards. The embodiments describe providing disparate media and/or data content to different transmission facilities based on an IP multicast tunneled packet-based data transport protocol, such as the data source transport protocol (DSTP) defined by ATSC A/324. The disparate media and/or data content may be routed to each transmission facility using secure tunneled content streams, such as tunneled DSTP streams, and then combined into a new broadcast signal for transmission or re-transmission using a gateway device, such as an edge gateway. Each gateway device is controlled using data carried in a dedicated tunneled content stream (e.g., a tunneled DSTP stream) which also contains the signed signaling data for that broadcast signal transmission. In some embodiments, a transceiver may be included for receiving the broadcast signal and delivering the secure tunneled content streams for use by the gateway device. The transceiver is also controlled using data in a dedicated tunneled content stream (e.g., a tunneled DSTP stream).

The embodiments of the present disclosure also describe several configurations for a broadcast communication system including broadcast retransmission systems, full duplex broadcast communication systems and multi-link communication systems. The present disclosure also describes one particular embodiment using aspects of the present embodiments that enables emergency alert system (EAS) encoder decoder devices, or ENDECs, without physical Internet connections to communicate with EAS consolidation equipment at the broadcast or transmission facility.

Fundamentally, the strength of the approach described in the present disclosure is the capability to deliver content and signaling to only those transmitters that need it without duplication of data on the network used by the broadcast content distribution system. In a large area network with a plurality of transmission facilities, most of the content may be the same. Currently in many cases, signaling and identification is not changed at all and transmission facility station identification is accomplished using an announcement of all possible call letters and channels on which the broadcast signal can be received. Emergency event information, such as weather alert notifications, are broadcast to the entire geographic region instead of just to the impacted geographic areas.

It is noted that it is possible to use other signaling layers for delivering disparate content to the different transmission facilities. For instance, all of the disparate content and data for each of the broadcast signals at the different transmission facilities may be included in a single physical layer transport stream, such as an ATSC 3.0 station to transmitter link transport protocol (STLTP) stream. However, the disadvantage to this approach is that it limits the capabilities and features provided by the broadcast transmission protocol in much the same way as what occurs currently. Further, using a separate physical layer transport stream (e.g., an STLTP stream) for each transmission facility having disparate media or data content would be highly transmission signal bandwidth inefficient and likely may not even be possible depending on the network capability and number of transmission facilities. Providing multiple tunneled content streams, each with separate content and signaling, and allowing each transmission facility to be configured to only use the content and signaling it requires to transmit the new broadcast signal is more efficient in terms of costs and transmission bandwidth.

FIG. 1 illustrates a block diagram of an exemplary broadcast content distribution system 100 according to aspects of the present disclosure. In broadcast content distribution system 100, content from one or more content sources is provided to studio content processing system 105. Studio content processing system 105 is coupled to broadcast gateway 110. Broadcast gateway 110 is coupled to exciter 115. Exciter 115 is coupled to transmitter 120. Transmitter 120 is coupled to the transmitter antenna 125, which radiates the broadcast signal provided from transmitter 120 into the airwaves. Receiver antenna 150 received the broadcast signal that was radiated by transmitter antenna 125. Receiver antenna 150 is coupled to transceiver 155. Transceiver 155 is coupled to gateway 160. Gateway 160 is coupled to exciter 165. Exciter 165 is coupled to transmitter 170. Transmitter 170 is coupled to the transmitter antenna 175, which radiates the broadcast signal provided from transmitter 170 into the airwaves. Nominally, the studio content processing system 105, broadcast gateway 110, exciter 115, transmitter 120, and antenna 125 are collocated (e.g., in the same building or facility) and represent a broadcast signal transmission mechanism for delivering broadcast signals for use by the public within a first geographic area. Further, the receiver antenna 150, transceiver 155, gateway 160, exciter 165, transmitter 170, and transmitter antenna 175 are also collocated at a geographic location that is different from the location of the elements mentioned above and may represent a broadcast signal transmission mechanism for delivering broadcast signals for use by the public within a second or different geographic area.

Broadcast content distribution system 100 represents a configuration where another second broadcast signal transmission arrangement or facility, including receiver antenna 150, transceiver 155, gateway 160, exciter 165, transmitter 170 and transmitter antenna 175, is connected into a broadcasting network capable of accessing the broadcast signal transmitted by antenna 125 as part of a first transmission arrangement or facility. Such a configuration is known as a heterogeneous re-transmission system. Although not shown, other communication media may be included as part of the broadcast network connecting the various arrangements and/or facilities including, but not limited to, a microwave communications link, a high-speed fiber communications link, a lower speed copper wire communications link, and cellular or wi-fi communications link.

In the FIG. 1, the transmitter 120 is configured as the main or original transmission source of a broadcast signal, but in some embodiments, it may not be the main or original transmission source. Most broadcast signals rely on a set of standards in order to maintain compatibility between the signal transmission and the signal receivers used for receiving the signal transmission. Most standards further implement the communication structures within various elements and signals based on protocol layers, starting at the physical RF layer, referred to as the PHY layer, and moving through to the application layer.

Media content (e.g., audio and video signals) as well as data content is received by studio content processing system 105. The studio content processing system 105 may include one or more devices for processing media content for delivery and/or transmission through broadcast content distribution system 100. The studio content processing system may include, but is not limited to, encoders, packagers, signal converters, and the like. The media content may be provided from one or more media content sources including, but not limited to, content production studios, content distribution companies, broadcast content providers, and the like. Media content may also be provided from alternative content sources such as websites, content subscription service companies and interactive applications providers. Data content may also be provided by one or more of the above-mentioned content sources as well as from specific data content sources such as media content listing or content guide services companies. The media content and/or the data content may be provided as raw digital data that is unencoded and unencrypted, particularly with respect to any broadcast standard protocols. The studio content processing system 105 processes the media and data content from the various content sources to produce one or more content streams. The content streams may be encoded and/or compressed using one or more media content encoding or compression protocols including but not limited to, the motion picture experts group (MPEG) standard MPEG-4, MPEG-4 advanced video coding (AVC), and MPEG-H Part-2. These content streams may further be formatted into internal protocol packets based on any one of several possible network friendly protocols. For example, the streams may be formatted as Real-time Transport Protocol (RTP)/User Datagram Protocol (UDP)/internet protocol (IP) multicast streams as part of data source layer processing. In some embodiments using ATSC 3.0 transmission standards, the streams may be formatted as Real-time Object Delivery over Unidirectional Transport (ROUTE) or Motion Picture Experts Group MPEG Media Transport (MMT) packets. Some of these multicast streams allow the IP packets destined for broadcast signal receivers to be tunneled through any IP network without need to provide special routing or other consideration for the receiver IP address space. Tunneling is a networking mechanism that allows data in any format across diverse networks. In some embodiments, the streams are further formatted using a DSTP as described in the ATSC standard A/324.

The one or more content streams from studio content processing system 105 are provided to broadcast gateway 110. Broadcast gateway 110 processes the one or more content streams and formats the signals into a broadcast signal transport stream. The processing in broadcast gateway 110 includes encapsulating and formatting the IP packets in the one or more content streams into link layer packets as part of a baseband data packet stream based on a specific transport protocol. In some embodiments, broadcast gateway 110 encapsulates the one or more content streams by adding a data link layer based on the ATSC Link Layer Protocol (ALP) described in ATSC Standard A/330 that carries the IP packets provided by studio content processing system 105 over the ATSC 3.0 broadcast standard physical layer. The encapsulation may further provide the mapping of some or all of the IP packets extracted from the content streams into sub-streams within the broadcast streams, often referred to as physical layer pipes (PLPs).

The processing in broadcast gateway 110 also includes packet management or scheduling in order to convert the broadcast signal transport stream into a stream containing baseband data packets suitable for processing by the exciter 115. The broadcast gateway 110 also generates a network configuration and control stream as well as a preamble stream as part of the scheduling operation. In some embodiments, the network configuration and control stream may be referred to as a timing and management control data stream. The broadcast signal transport stream, including the network configuration and control stream and preamble data stream, are used by exciter 115 to create the broadcast emission signal waveform. In some embodiments, one or more packets of the broadcast signal transport stream may be tunneled using a protocol such as the STLTP as described in ATSC standard A/324 as part of an ATSC broadcast. Further, in some embodiments, the tunneled packets may include a security mechanism, such as a packet or stream signature, allowing exciter 115 to determine if the packet or stream has been tampered with. Information associated with packet or stream security associated with the present disclosure will be described in further detail below.

Exciter 115 receives the broadcast signal transport stream, along with the network configuration and control stream and preamble data stream, from the broadcast gateway and provides additional link layer signal processing to the streams to form the broadcast emission signal based on the network configuration and control stream and preamble data stream. The link layer signal processing may include one or more forms of data error correction encoding, temporal interleaving encoding, and data signal modulation. The data error correction encoding may include, but is not limited to, Reed-Solomon encoding, Viterbi encoding, Bahl, Cocke, Jelinek, and Raviv (BCJR) encoding, and low-density parity check (LDPC) encoding. The data signal modulation may include but is not limited to vestigial sideband (VSB) modulation, multi-level quadrature amplitude modulation (QAM), and multi-level orthogonal frequency modulation (OFDM). The resulting broadcast signal is converted from a digital format signal to an analog format baseband or low frequency signal and further upconverted to a frequency for transmission as analog transmission signal. In some embodiments the frequency for transmission may be in the very high frequency (VHF) range from 54 megahertz (MHz) to 88 MHz and 174 MHz to 216 MHz or in the ultra-high frequency (UHF) range from 470 MHz to 868 MHz The exciter 115 may also apply analog signal transmission precorrection to account for known or anticipated signal distortion caused by signal amplification in transmitter 120.

It is important to note that the link layer signal processing, data signal modulation, and signal up-conversion used by exciter 115 may conform to one or more of several broadcast signal physical layer broadcast standards. Such broadcast standards include, but are not limited to, ATSC 3.0, the digital video broadcasting (DVB) standard DVB-T2, and the integrated services broadcasting (ISDB) standard ISDB-T.

Transmitter 120 receives the analog transmission signal from exciter 115 and amplifies the signal from its received signal level of around one milliwatt (mW) to a level between one kilowatt (kW) and ten kW. Transmitter 120 may perform the amplification in stages and may include signal filtering between the stages as well as at the output in order to remove signal distortion artifacts and other undesired signal energy outside of the desired frequency range for the transmitted signal. It is worth noting that the type and amount of amplification and filtering that is used in transmitter 120 may affect the type and necessity for analog signal transmission precorrection that may be applied by exciter 115. The amplified RF transmission signal is provided to transmitter antenna 125 for emission as an over the air broadcast signal. The transmitter antenna 125 may include one or more antenna elements that are arranged and/or configured to provide the necessary or desired radiated emission pattern in order to provide the proper geographic cover area for the RF transmission signal. As illustrated, transmitter antenna 125 is incorporated as part of a communication tower that may be 50 or more feet tall. In some embodiments, transmitter antenna 125 may be incorporated as part of other structures including, but not limited to, a residential or commercial dwelling, a utility pole, a bridge, and the like.

Receiver antenna 150 receives the over the air broadcast signal from transmit antenna 125. The receiver antenna 150 may be composed of one or more antenna elements and may be arranged to be a high gain narrow bandwidth directional antenna for receiving the specific frequency range (e.g., VHF or UHF) used for the over the air broadcast signal. In some embodiments, receiver antenna 150 may include multiple antennas to receive multiple broadcast signals from different locations simultaneously. The receiver antenna 150 may be incorporated as part of a communication tower that may be 50 or more feet tall. In some embodiments, transmitter antenna 125 may be incorporated as part of other structures including, but not limited to, a residential or commercial dwelling, a utility pole, a bridge, and the like. The receiver antenna 150 may be located and/or oriented to mitigate unnecessary interference from any transmitter antennas (e.g., transmit antenna 175) that may be collocated or located nearby.

The over the air broadcast signal received by receiver antenna 150 is provided to transceiver 155. Transceiver 155 tunes, demodulates, decodes, and formats the received signal into one or more portions of the signal or sub-streams according to one more or physical layer broadcast signal protocols, such as those described above. The transceiver 155 may further separate out the portions or sub-streams of the received broadcast signal and convert some or all of the portions or sub-streams into IP packets arranged as one or more content streams in a manner similar to that described above for studio content processing system 105. Gateway 160 processes the one or more baseband content streams and formats the streams into one or more broadcast signal transport streams for use by exciter 165. The processing in gateway 160 includes encapsulating and formatting the IP packets contained in the one or more content streams into link layer packets as part of the baseband streams used as part of the re-broadcast of the received signal based on a specific transport protocol as described above for broadcast gateway 110.

Exciter 165 receives the broadcast signal transport stream(s) containing the one or more content streams from the gateway 160 and provides additional link layer signal processing to the streams to form a broadcast emission signal and, finally, an analog transmission signal, for re-broadcast as described above for exciter 115. The one or more baseband streams are similar to the content streams received from broadcast gateway 110, as described above may include, among other elements, a network configuration and control stream and a preamble data stream. Transmitter 170 receives the analog transmission signal from exciter 165 and amplifies the signal in a manner similar to that described above for transmitter 120. The amplified RF transmission signal is provided to antenna 175 for emission over the air as described above for antenna 125. It is worth noting that the frequency that is used for the analog transmission signal in exciter 165 may be the same as, or different from, the frequency used for the analog transmission signal from exciter 115 depending on the signal transmission format and/or protocol used.

In operation, the studio content processing system 105, broadcast gateway 110, exciter 115, transmitter 120, and antenna 125 represent a broadcast signal transmission arrangement or facility for delivering broadcast signals for use and consumption of media and/or data content by signal receivers operated by users within a geographic area. The network configuration and control stream and preamble data stream received from the broadcast gateway 110 contains the data that the exciter 115 uses to construct the final RF transmission signal containing the content stream(s) from the studio content processing system 105. In this manner, the network configuration and control information is distributed to the exciter 115 within the transport link layer. The transmitted signal from transmitter antenna 125 is received at receiver antenna 150. The received signal, containing audio and video content along with data content, is tuned and demodulated in transceiver 155. Transceiver 155 also selects out a first portion of the data content and a second portion of the data content from the received first broadcast signal, the first portion containing the network control and configuration information and the second portion containing replacement content. The first and second portions are converted back into baseband packet streams, as internet protocol streams, in gateway 160. Gateway 160 processes the replacement content to form a new broadcast signal transport stream using the network configuration and control information. The new broadcast signal transport stream is provided to exciter 165 to transmit as a new or different broadcast signal. The exciter 165 receives the new broadcast signal transport stream and produces a broadcast emission signal similar to the signal at the output of exciter 115. For operation that involves re-broadcasting the original signal as transmitted by antenna 125, the transceiver 155, gateway 160, and exciter 165 may be configured to process the received signal without modification. In some embodiments, the exciter 165 may be configured to upconvert the broadcast emission signal provided to transmitter 170 to a frequency that is different from the frequency used by exciter 115.

As described above, the transmitter 170, through transmitter antenna 175, may deliver a broadcast signal, referred to as the re-transmitted broadcast signal. The re-transmitted broadcast signal may include all of the broadcast signal transmitted by transmitter 120 through transmitter antenna 125, for use by the public within a second or different geographic area than the geographic area covered by the original broadcast signal. However, the configuration of broadcast content distribution system 100 is also capable of providing a re-transmitted broadcast signal that is different from the original broadcast signal received by antenna 150. In order to create a different re-transmitted broadcast signal, one or more broadcast signal transport streams provided by broadcast gateway 110 may be configured to contain network configuration and control information associated with operating exciter 165 as part of signal re-broadcast or re-transmission through transmitter antenna 175. In such an arrangement, the network configuration and control information used by exciter 165 to generate a different broadcast emission signal for re-broadcasting may be generated and distributed at the data source layer through broadcast gateway 110 and included in the original broadcast signal.

Additionally, in order to provide the network configuration and control information to exciter 165 for generating a broadcast signal that is different from the originally broadcast signal, network configuration and control information for configuring transceiver 155 is included in one or more of the content streams produced by studio content processing system 105. The transceiver network configuration and control information may, for instance, be included as part of a low-level signal layer as part of a data source layer protocol. In some embodiments, the transceiver network configuration and control information may be included in dedicated content streams so that the content streams may be terminated (e.g., as IP packets) at transceiver 155 and not provided to gateway 160. The transceiver network configuration and control information is used by transceiver 155 to configure one or more content streams delivered to gateway 160 to include gateway network configuration and control information for operation of gateway 160. The gateway network configuration and control information may be included as part of one or more content streams that are configured for tunneling, such as the DSTP streams described above. The gateway network configuration and control information is used by gateway 160 to configure one or more content streams delivered to exciter 165 to include specific network configuration and control information for operation as part of generating the new broadcast emission signal. The gateway network configuration and control information is also used by gateway 160 to determine which of the one or more content streams containing media or data content provided through studio content processing system 105 will be provided to exciter 165 for inclusion in the new broadcast signal for transmission.

In some embodiments, the content streams containing the transceiver network configuration and control information, the gateway network configuration and control information, and the timing and management configuration used by exciter 165 may be put into the same PLP in order to further simplify the reception and extraction processing in transceiver 155. Further, this dedicated PLP may be carried as a separate portion of the broadcast, using techniques such a Layer Division Multiplexing (LDM), to allow distinction from the typical broadcast content. The content streams containing media or data content provided through studio content processing system 105 may be placed in one or more other PLPs.

In some embodiments, more than one transmission arrangement or facility may be employed for re-broadcast of the broadcast signal transmitted by transmitter 120 through antenna 125. As such, additional content streams may be created in studio content processing system 105 and broadcast gateway 110 that include network configuration and control information that is addressed to the transceivers, gateways, and exciters at those additional locations or facilities using the mechanism described above.

It is worth noting that many broadcast signal transmission protocols, such as ATSC 3.0, include a security mechanism, (e.g., a signature or security key) that prohibits modification of content streams in the broadcast signal, such as adding metadata to describe the new broadcast signal that will be broadcast by transmitter 170 through transmitter antenna 175. By utilizing additional content streams with information targeted for use in the elements of a re-broadcast facility as described above, the security mechanism in the protocol remains unaffected.

As described above, broadcast signal transmission protocols, such as ATSC 3.0, often require a security mechanism in order to prevent undesired attacks on the media or data content as well as the broadcast signal itself. One of the most common security mechanisms involves the use of a combination of private and public keys to "sign" the content at one or more points in the transmission portion of the distribution system. In broadcast content distribution system 100, the studio content processing system 105 and broadcast gateway 110 include private keys for signing outgoing packets in their respective output data streams. Gateway 160 along with exciter 115 and exciter 165 also contain private keys to be used to validate security updates provided the studio content processing device. The security update information is also encrypted with public keys provided by gateway 160 as well as exciter 115 and exciter 165. Additionally, public keys associated with one or more private keys are present in any element in broadcast content distribution system 100 that needs to validate a signed packet or stream, such as broadcast gateway 110 exciter 115, transceiver 155, and gateway 160. It is worth noting that gateway 160 does not contain private keys for signing its outgoing packets since gateway 160 and exciter 165, along with transceiver 155, are likely collocated in a relatively insecure location.

Packet signing is performed using a private key at the broadcast gateway 110, while the transmission of new public keys in the security stream portion of the broadcast signal transport stream (e.g., STLTP stream) is also performed by the broadcast gateway using the public keys of exciters 115 and 165. Exciters 115 and 165 validate the received keys using its local private key. In other words, the broadcast gateway 110 signs the packets using its private key and exciters 115 and 165 use the public key from broadcast gateway 110 to validate the signature. Further, the public keys from broadcast gateway 110 are encrypted using a public key from each exciter 115 and 165 respectively to allow the public keys from broadcast gateway 110 to be sent securely to additional exciters. The exciters 115 and 165 use their private key to unencrypt the public key from broadcast gateway 110 for use in checking the packets at the transport link layer (e.g., STLTP).

The transceiver 155 validates the signed content and data within the received broadcast signal as if it were a typical broadcast signal receiver. This validation operation includes verifying that the low-level and service-level signaling content has not been compromised and can be sent for further processing. A separate security stream that is part of the transceiver management control information would also be used to validate some or all the other content packets. The separate validation further precludes security attacks where the signaling was left intact but some content was replaced.

As described above, gateway 160 validates the incoming secure content streams (e.g., DSTP streams) from transceiver 155, but does not include private keys to sign the resulting broadcast signal transport stream (e.g., STLTP stream) provided to exciter 165. Note there is still a private key needed to validate the security information, but this is used in the same way as described above for validating security updates. Further, gateway 160 will receive separate gateway network configuration and control information as part of one or more content streams, as described above, to support the associated new arrangement of the broadcast signal transport stream associated with the re-broadcast signal. In scenarios that include multiple re-broadcast locations and/or facilities as part of a broadcast content distribution system, the broadcast gateway 110 may be configured to provide different gateway network configuration and control information in content streams, representing unique content re-broadcast signals, for each gateway at the different re-broadcast location and/or facilities. The mechanism to provide separate network configuration and control information allows signaling and applications to be signed in one secure location and then distributed throughout the network without modification. The fundamental requirement is that the signaling data destined for individual transmitters must be different but immutable.

In order to better facilitate the various aspects of the present disclosure, the following additions and/or modifications to one or more of the protocols that may be used, particularly with respect to the ATSC 3.0 broadcast standard, are described below. It is worth noting that one or more of these additions and/or modifications may also apply to protocols that are included part of other broadcast transmission standards including, but not limited to, those described above including, for example, ATSC 3.0 Link Layer Protocol Transport Protocol (ALPTP).

The Data Source Transport Protocol was initially developed as a tunneling protocol limited to use in a transmission broadcast studio (e.g., studio content processing system 105 as described in FIG. 1). The security and control mechanisms originally described in ATSC standard A/324 only apply to the STLTP since it was expected to be used to communicate with physically separate transmitter sites, sometimes using physically uncontrolled communication mechanisms such as a microwave communication link. In addition, the STLTP was designed as a simplex, one-way protocol with command and control being passed through the protocol without the need for return acknowledgement or other communication.

By applying the changes as described below to various aspects in the A/324 standard, a DSTP can be enabled to be routed throughout a broader network with potentially limited control and one-way communication.

First, the security mechanisms defined in A/324 could readily be applied to any of the common tunneling protocols (CTPs) described in that standard, including DSTP. The security system relies on two security key mechanisms, providing an encrypted signature for any or all tunneled packets, and signaling new rotating signatures through a separate security stream.

For STLTP, when any tunneled packet is signed, the signature, referred to as the Galois message authentication code (GMAC) tag in the standard, is placed in an RTP header extension. This is convenient because all tunneled packets within the STLTP are RTP-based so adding a header extension can be done when any packet is created by a broadcast gateway (e.g., broadcast gateway 110). To sign these packets, however, a private key is required to encrypt the signature. The security stream itself is an RTP stream which can be signed as any other tunneled packet stream within the STLTP.

To accommodate applying the security mechanisms to the CTP and, thereby, to DSTP, the signature must be placed in the information header for the tunneled packet instead of in the tunneled packet itself. The information header is used to communicate information about the tunneled packet to a gateway (e.g., gateway 160) without the need for the Gateway to examine the packet itself. An example of a format that may be used as an information header for a DSTP tunneled packet listed in Table 1. The added fields with respect to the A/324 standard are shown in italic text.

TABLE 1

| Syntax | No. of Bits | Format |
|---|---|---|
| information_header( ) { | | |
|    dest_address | 32 | uimbsf |
|    port_number | 16 | uimbsf |
|    length | 16 | uimbsf |
|    group | 16 | uimbsf |

TABLE 1-continued

| Syntax | No. of Bits | Format |
|---|---|---|
|    type | 8 | uimbsf |
|    random_access_point | 1 | bslbf |
|    time_limit_flag | 1 | bslbf |
|    if ( type >= '1' && type <= '5' ) { | | |
|       wakeup_control( ) | 2 | A/324 Section 7.2.2 |
|    } | | |
|    else { | | |
|       reserved | 2 | '00' |
|    } | | |
|    signed_flag | 1 | bslbf |
|    reserved | 3 | '000' |
|    if (time_limit_flag == '1' ) { | | |
|       timestamp( ) | 32 | A/324 Table 6.3 |
|    } | | |
|    if ( signed_flag == '1' ) { | | |
|       reserved | 12 | '000000000000' |
|       key_num | 4 | uimbsf |
|       GMAC_tag | 128 | uimbsf |
|    } | | |
| } | | | signed_flag shall indicate that the tunneled packet and its associated information header are signed. The key_num and GMAC_tag fields are included in the information header if signed_flag is '1'.

key_num shall indicate the index number of the GCM key used in authentication of the packet. It shall have a value in the range from 0x0 through 0x4. A value of 0x0 shall indicate that no authentication processing is applied. Values from 0x1 through 0x4 shall indicate that authentication processing is applied using the key having the index number given. Values 0x5 through 0x7 shall be reserved. GMAC_tag shall be the 128-bit galois meessage authentication code (GMAC) tag calculated for the packet using a combination of the key value indicated by the key_num field, the Initialization Value determined as described in A/324 Section 9.4.1, and the galois hash (GHASH) function applied to the structural elements including the Tunneled Packet Information Header with the GMAC_tag field set to zeroes plus the tunneled packet.

For the tunneling packets, such as with the CTP, the security stream need not change and can be defined as in A/324 Section 9.4.5 Security Data Stream Protocol. Note that a similar technique would also be required to extend ALPTP to support security since it also employs Tunneled Packet Information Headers. Such techniques will not be described in further detail here as the techniques are known to those skilled in the art.

Second, there is a management stream emitted from the broadcast gateway (e.g., broadcast gateway 110) to control certain operations in exciters (e.g., exciter 115). This is required for situations where the exciter has no return path for communication or management from a broadcast studio device (e.g., studio content processing system 105). The timing and management protocol provides a means for a broadcast gateway to send configuration and timing information to the exciter.

To allow a gateway device, such as gateway 160, to be managed on the receiving side of a one-way broadcast, a similar management and timing protocol must be developed to allow the gateway device to be configured. One of the configuration elements that must be provided is a mapping from the Tunneled UDP/IP packets within the DSTP tunnel to the ALP streams constructed by the ALP encapsulator function within the gateway device. This mapping is described in detail in A/324 Section 7.1.

Figure 2:
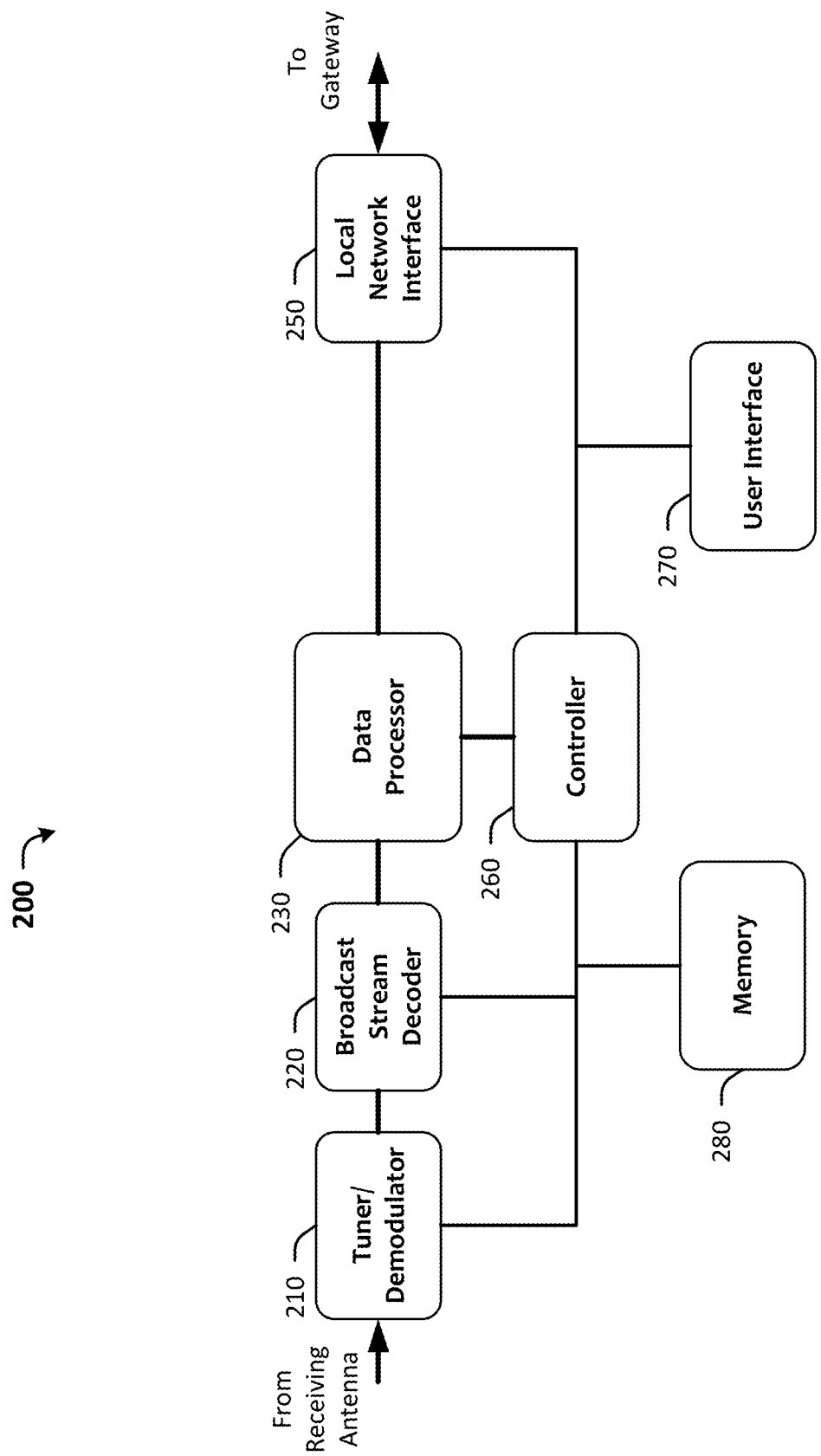
FIG. 2 is a block diagram of an exemplary transceiver used in a broadcast content distribution system according to aspects of the present disclosure.

FIG. 2 illustrates a block diagram of an exemplary transceiver 200 used in a broadcast content distribution system according to aspects of the present disclosure. Transceiver 200 provides over the air broadcast signal reception capabilities as part of a broadcast signal distribution system, including a broadcast repeater system similar to that described in FIG. 1. Transceiver 200 may operate in a manner similar to transceiver 155 described in FIG. 1. In transceiver 200, content is received from a receiving antenna (e.g., receiver antenna 150 in FIG. 1) and provided to tuner/demodulator 210. The tuner/demodulator 210 is coupled to broadcast stream decoder 220. Broadcast stream decoder 220 is coupled to data processor 230. Data processor 230 is coupled to IP stream encoder 240. IP stream encoder 240 is coupled to local network interface 250, which provides an external communication interface to additional components in the broadcast signal distribution system (e.g., gateway 160 in FIG. 1). User interface 270 is included for interfacing with a user as part of controlling or monitoring the transceiver 200. Controller 260 is coupled to tuner/demodulator 210, broadcast stream decoder 220, data processor 230, IP stream encoder 240, local network interface 250, user interface 270, and memory 280. It is worth noting that some elements or components that may be necessary for proper operation of transceiver 200 are not shown or described here for the sake of conciseness as they are well known to those skilled in the art.

Tuner/demodulator 210 tunes and demodulates the broadcast signal received from a receiving antenna (e.g., receiver antenna 150 in FIG. 1). The broadcast signal will have signal energy within a specific region or band of frequencies, typically between six and ten MHz in bandwidth, within the VHF and UHF range. The broadcast signal is typically provided over a coaxial cable from the receiving antenna through one or more suitable RF connectors, such as F-type connectors, mounted on the transceiver 200. The tuner/demodulator 210 can be controlled to perform its processing based on a specific broadcast signal transmission protocol to produce a baseband data packetstream (e.g., ATSC 3.0 ALP stream) using control signals from controller 260. The tuner/demodulator 210 further extracts baseband data packets based on which physical layer pipes (PLPs) that can be demodulated as part of the tuning and demodulation functions. The tuning and demodulating functions used in tuner/demodulator 210 may be included as part of one or more components, such as integrated circuits or multi-chip modules. The components or elements used may include, but are not limited to, filters, amplifiers, frequency downconverters, analog to digital signal converters, multi-phase multi-amplitude demodulators, error correction decoders, and the like. In some cases, one or more of the elements may be implemented as part of firmware or software in a digital signal processor.

The baseband transport packet stream(s), referred to as sub-streams, from tuner/demodulator 210 are provided to broadcast stream decoder 220. The sub-streams are provided to data processor 230. Data processor 230 further separates out groups of data packets from the sub-streams. Data processor 230 may separate packets that are intended for operation and control of a collocated or coupled processing device, such as a processing device (e.g., gateway 160 and/or exciter 165 in FIG. 1), from packets containing data that will be directly transmitted without further processing, as part of a broadcast signal retransmission. Data processor 230 may also reformat any of the data as needed for further processing in other components. For example, the data received at data processor 230 may be from a data source requiring content stream (e.g., DSTP) encapsulation. The data may further already be in a content stream, baseband data packet stream, or broadcast signal transport stream (e.g., ALPTP or STLTP) format and may be processed and routed as necessary.

Local network interface 250 includes circuitry to perform local network signal processing functions for transmitting and receiving signals as part of communication with another device in the broadcast signal distribution system (e.g., gateway 160 in FIG. 1). The signal processing functions in local network interface 250 may include protocol configuration used for operation on local networks, such as Ethernet or wireless networks. Local network interface 250 also includes an interface connector suitable for the type of communication medium used with the local network. The interface connector may include, but is not limited to, an F-type coaxial connector, a straight tip (ST) type optical connector, a registered jack (RJ) type RJ-11 or RJ-45 connector, a mechanical transfer registered jack (MT-RJ) type connector, and the like. Local network interface 250 may also include one or more antennas that may be configured for use with wireless operation in the local network.

Memory 280 supports storage of programming instructions and data associated with the control and operation of the transceiver 200 through controller 260 as well as the other elements of the transceiver 200. Memory 280 may include one or more of the following storage elements including, but not limited to, RAM, ROM, Electrically Erasable Programmable ROM (EEPROM), and flash memory. Memory 280 may also encompass one or more integrated memory elements including, but not limited to, magnetic media hard disk drives and optical media disk drives.

User interface 270 may include a user input or entry mechanism, such as a set of buttons, a keyboard, or a microphone. User interface 380 may also include circuitry for converting user input signals into a data communication format to provide to controller 260. User interface 270 may further include some form of user notification mechanism to show device functionality or status, such as indicator lights, a speaker, or a display. User interface 270 may also include circuitry for converting data received from controller 260 into signals that may be used to operate the user notification mechanism.

Controller 260 receives status information as well as information about the data in the received broadcast signal from the various elements, processes the information, and provides control information back to the various elements within transceiver 200. Controller 260 may also receive control instructions for specific operation and processing to be performed in transceiver 200 from external devices in the broadcast signal distribution system (e.g., gateway 160 in FIG. 1). Controller 260 processes the instructions and provides the necessary control information to the various elements in transceiver 200 to perform the specific operation and processing.

It is worth noting that one or both of data processor 230 and controller 260 may be using a programmable microprocessor that is reconfigurable with downloadable instructions or software code stored in memory 280. One or both of data processor 230 and controller 260 may alternatively be a specifically programmed controller and data processor with internal control code for controlling, managing, and processing all functions and data in transceiver 200. Further, one or more of the elements described in transceiver 200 may be combined into a larger component and may be implemented as a programmable microprocessor or as a specifically programmed processing circuit.

In operation, a broadcast signal containing media content as well as data content is received at tuner/demodulator 210 from a receiving antenna (e.g., receiver antenna 150 in FIG. 1). The broadcast signal includes a first portion of data content and a second portion of data content. The first portion and second portion may be in one or more PLPs and contain network configuration and control information and additional or replacement content that will be transmitted as part of a second, different broadcast signal. The tuner/demodulator 210 further selects the first portion of data content and the second portion of data content from the received broadcast signal. All of, or portions of, the received broadcast signal is converted into data packets in broadcast stream encoder 220 and data processor 230 and encoded as one or more multicast IP streams in IP stream encoder 240. More specifically, the first portion and the second portion of the data content is converted into one or more data packets included in one or more multicast IP streams that are configured to include configuration and control information and specific content information for retransmission. In some embodiments, the one or more multicast IP streams may be configured as tunneled IP streams based on a data layer protocol such as DSTP. Further, the IP streams (e.g., DSTP streams) may include a security mechanism as part of a header packet used in the DSTP stream. The IP streams are provided to a further device, such as gateway 160 described in FIG. 1, for further processing to generate and transmit a second, different broadcast signal.

Figure 3:
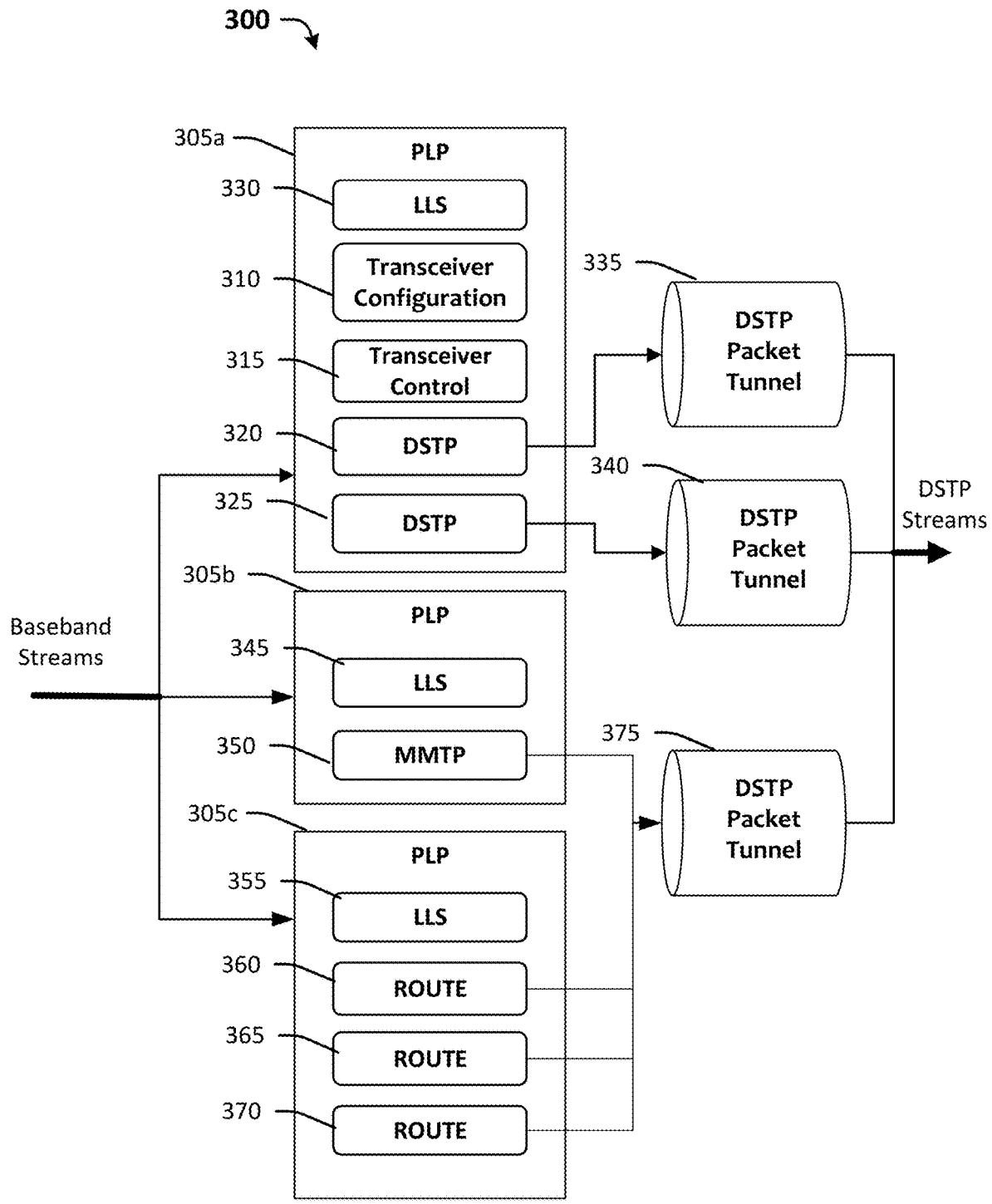
FIG. 3 is an exemplary signal diagram associated with signal processing performed as part of a broadcast signal content distribution system according to aspects of the present disclosure.

FIG. 3 illustrates an exemplary signal diagram 300 associated with the signal processing performed as part of a broadcast signal content distribution system according to aspects of the present disclosure. Signal diagram 300 specifically illustrates various aspects of signal processing and management performed within a transceiver, such as transceiver 200 described in FIG. 2 or transceiver 155 described in FIG. 1. Signal diagram 300 illustrates the elements associated with an over the air broadcast signal and how the elements are processed, repackaged, and provided to other devices, such as a gateway, in the broadcast signal content distribution system. It is worth noting that some or all of the aspects of signal diagram 300 may equally apply to operation of other transceivers that may perform similar operations and processing as transceiver 200 as to operations in different configurations of broadcast content distribution systems. Further, signal diagram 300 will primarily be described with respect to the protocols associated with the ATSC 3.0 broadcast signal standard. Additionally, some or all of the aspects of signal diagram 300 may be applicable to other broadcast signal standards including, but not limited to, those mentioned above.

In signal diagram 300, the received broadcast signal is demodulated and decoded (e.g., in tuner/demodulator 210 and broadcast stream decoder 220 and separated into 3 PLPs 305*a*, 305*b*, and 305*c* in data processor 230. PLP 305*a* includes data packets containing transceiver configuration information stream 310, information control stream 315, and tunneled DSTP stream 320 and 325. PLP 305*a* also contains an LLS stream 330 that contains only control information for transceiver 200 which in turn references information control stream 315. The transceiver configuration stream 310 contains all the necessary data structure that is needed to manage specific functionality of transceiver 200 (e.g., through controller 260). The information control stream 315 is used to communicate control information about the various other streams in the broadcast to allow the transceiver 200 to reconstruct a first DSTP packet tunnel 335 to provide the tunneled DSTP stream 320 and a second DSTP packet tunnel to provide tunneled DSTP stream 325 to a gateway device (e.g., gateway 160 in FIG. 1). The information control stream 315 also includes the original security signatures of the packets as part of source content processing originally delivered to a broadcast gateway (e.g., broadcast gateway 110).

It is worth noting that a received broadcast signal must be constructed or configured such that the transceiver (e.g., transceiver 200) can receive the information necessary to permit the generation of a new broadcast signal that remains ATSC 3.0 compliant as part of re-transmission or re-broadcasting (e.g., by transmitter 170 through transmitter antenna 175) This includes making sure that the PLP containing transceiver configuration information stream 310 and the information control stream 315 is configured such that it can always be received by the transceiver regardless of conditions.

PLP 305*b* contains an LLS stream 345 and a content stream in the form of an MMTP stream 350. PLP 305*c* contains an LLS stream 355, and content streams in the form of a ROUTE stream 360, a ROUTE stream 365, and a ROUTE stream 370. Note that the LLS stream 345 from PLP 305*b* and LLS stream 355 from PLP 305*c* are terminated in transceiver 200 and not provided on to the gateway device. LLS stream 345 and LLS stream 355 contain information about the broadcast signal that was received. LLS stream 345 and LLS stream 355 will not contain accurate information about the broadcast signal to be emitted as a new broadcast signal in a re-transmission type broadcast signal content distribution system as described in FIG. 1. The service list tables (SLTs) that are to be included in the new broadcast signal are contained in LLS streams carried within the tunneled DSTP stream 320 and tunneled DSTP stream 325, respectively. It is worth noting that the LLS streams must be contained in separate tunneled DSTP streams because, based on the ATSC 3.0 standard, the two LLS packet streams have the same designated IP address and port, 224.0.23.60:4497, and all tunneled packet streams within a DSTP must have unique addresses and port numbers. In other embodiments, the LLS streams or similar functional packets may be included in the same DSTP or similar functional content stream. The remaining content streams, MMTP stream 350 from PLP 305*b* and ROUTE streams 360, 365, and 370, are aggregated and provided through DSTP packet tunnel 375.

It is worth noting that to verify that the content of the broadcast stream received by transceiver 200 has not been tampered with, the information headers for the original DSTP streams carrying the MMTP and ROUTE streams 350, 360, 365 and 370, respectively, within PLPs 305*b* and 305*c*, may be separated from the packets in the stream prior to the original broadcast and sent as part of the information control stream 315. The originating gateway device (e.g., broadcast gateway 110 in FIG. 1) may append a timestamp (e.g., a 32-bit timestamp) that indicates when the packet was emitted in the broadcast (e.g., by transmitter 120 through transmitter antenna 125). This timestamp may be based on the international atomic time (TAI) in the emission so that transceiver 200 may determine which information headers line up with which packets. The other information in the information headers, such as the destination address, port, and length may be used to determine the exact packet associated with the information header. In this way, information headers may be "reattached" to packets to construct DSTP Packet Tunnel 375. A similar technique may be applied for other tunneled DSTP streams. Further, while reconstructing the information headers to tunneled DSTP streams containing unsigned content, transceiver 200 may verify that packets match the signature contained in the information headers provided separately. Using this technique, the information headers provided in the original DSTP stream to a broadcast gateway (e.g., broadcast gateways 110 and 710), including the signing information, may be reconstituted into the DSTP Packet Tunnel 375.

Tunneled DSTP stream 320 also contains configuration information for a gateway device (e.g., gateway 160 in FIG. 1). The configuration information is used by the gateway device to properly construct the new broadcast signal transport stream for use in generating the new broadcast signal for transmission. It is expected that the gateway device has been configured at installation time to accept configuration from a specific DSTP stream based on the multicast address and port number (e.g., for tunneled DSTP stream 320). Further, if more than one re-transmission configuration is included in the broadcast content distribution system, each gateway device would be initially configured to respond to a unique DSTP address and port number, and the corresponding configuration information included in the DSTP stream.

Tunneled DSTP stream 320 and tunneled DSTP stream 325 from PLP 305*a* are provided through DSTP packet tunnel 335 and 340 respectively for delivery to the gateway device (e.g., gateway 160 in FIG. 1). It is worth noting that tunneled DSTP stream 320 and tunneled DSTP stream 325 remain unaltered as they are provided through DSTP packet tunnel 335 and 340 to the gateway device.

While signal diagram 300 describes the presence of three PLPs, more or fewer PLPs may be present while still maintaining the various aspects of the present disclosure. Further, signal diagram 300 describes PLP 305*a* as containing all of the transceiver and gateway configuration and control information data. Including all of the transceiver and gateway related data in its own dedicated PLP or PLPs may be advantageous. For instance, the PLP 305*a* would not need to be tuned by normal consumer ATSC 3.0 receivers because it would not contain any service-related data and would only be used as a command-and-control pipe for the broadcast content distribution system itself. In other embodiments, where no advantage is realized, the transceiver and gateway configuration and control information may be included in several different PLPs and not in a dedicated PLP.

Further, one or more of PLPs may be present in the received broadcast signal that may not require all of the additional processing described in signal diagram 300. For example, one or more PLPs may contain content streams that represent only media content or data content that does not pertain specifically to the operation of the transceiver, gateway, or exciter. In these instances, the PLPs may be processed only to access and structure the content into DSTP streams.

Figure 4:
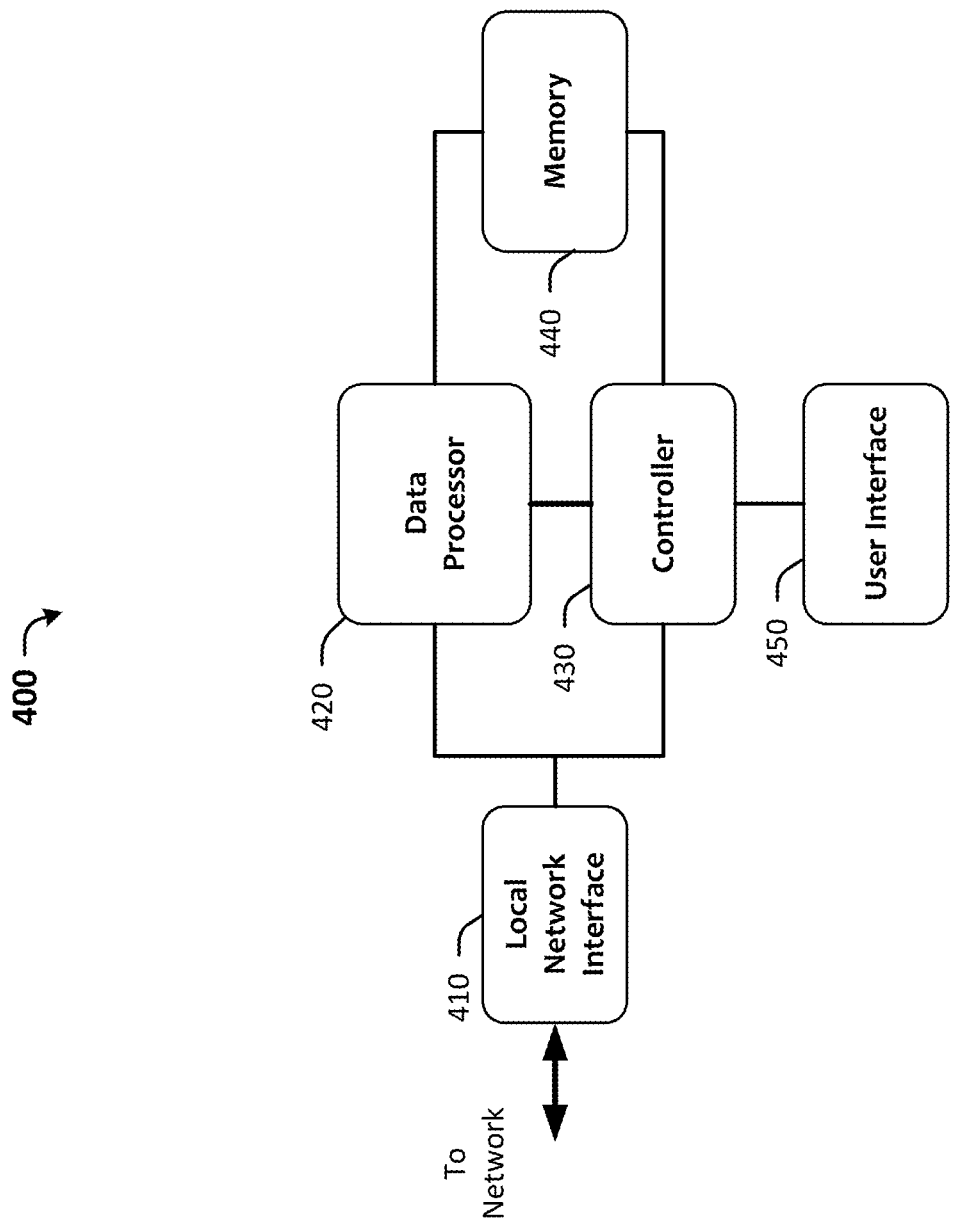
FIG. 4 is a block diagram of an exemplary gateway used in a broadcast content distribution system according to aspects of the present disclosure.

FIG. 4 illustrates a block diagram of an exemplary gateway 400 used in a broadcast content distribution system according to aspects of the present disclosure. Gateway 400 provides data routing and formatting capabilities as part of a broadcast signal distribution system, including a broadcast repeater system similar to that described in FIG. 1. Gateway 400 may operate in a manner similar to gateway 160 described in FIG. 1 and may further share some similar operational capability with broadcast gateway 110. It is worth noting that gateway 400, which may be referred to as an edge gateway device, is functionally different in several aspects with respect to gateway 110. For example, it is not common or, in many cases, practical, to use broadcast gateway 110, and similar broadcast gateways, as an edge gateway device for internet type communication due to the fact that a broadcast transmission channel does not have available bandwidth for a return communication path across the broadcast network. Further, gateway 400, and similar edge gateways, typically provide routing functionality that require only support for validating a limited key signing security system while broadcast gateway 110, and similar broadcast gateways, are configured to support a private key signing security system, such as is used in many broadcast content transmission protocols, a function not typically employed as part of an edge gateway. Gateway 400, and similar edge gateways, also can be controlled using a management stream that is included as part of the data provided in the streaming content allowing unattended operation.

In gateway 400, one or more content streams are received from a processing device connected as part of a local network, such as a transceiver (e.g., transceiver 155 in FIG. 1), at local network interface 410. Local network interface 410 is coupled to both data processor 420 and controller 430. Both data processor 420 and controller 430 are coupled to memory 440. Controller 430 is coupled to both data processor 420 and user interface 450. Signals and data from data processor 420 and controller 430 are provided to local network interface 410 for transmission to another processing device connected as part of a local network, such as an exciter (e.g., exciter 165 in FIG. 1). It is worth noting that some elements or components that may be necessary for proper operation of transceiver 200 are not shown or described here for the sake of conciseness as they are well known to those skilled in the art.

Local network interface 410 includes circuitry to perform local network signal processing functions for transmitting and receiving signals as part of communication with another device in the broadcast signal distribution system (e.g., transceiver 155 or exciter 165 in FIG. 1). The signal processing functions in local network interface 410 may include those used for local networks as described above for local network interface 250 in FIG. 2. Local network interface 410 also includes an interface connector suitable for the type of communication medium used with the local network as described above for local network interface 250.

Processor 420 receives data from, and provides data to, the local network interface based on the type of communication between gateway 400 and other devices in the network. Processor 420 may analyze the data it receives and/or processes, aggregate the received data where possible, and route the processed data to its final destination, either directly or indirectly. Controller 430 receives status information about operation of gateway 400 as well as information about the data that is provided to, and delivered from, processor 420. Controller 430 may also receive control instructions for specific operation and processing or requests for status to be performed in gateway 400 from external devices in the network (e.g., transceiver 155 in FIG. 1). Controller 430 processes the instructions or requests and provides the necessary control information to processor 420 to perform the specific operation and processing of data.

It is worth noting that one or both of data processor 420 and controller 430 may be embodied as a programmable microprocessor that is reconfigurable with downloadable instructions or software code stored in memory 280. One or both of data processor 430 and controller 430 may alternatively be a specifically programmed controller and data processor with internal control code for controlling, managing, and processing all functions and data in gateway 400. Further, data processor 420 and controller 430 may be combined to form a single processing element and further embodied as described here.

Memory 440 supports storage of programming instructions and data associated with the control and operation of the gateway 400 through data processor 420 and controller 430. Memory 440 may include one or more of the following storage elements including, but not limited to, RAM, ROM, EEPROM, and flash memory. User interface 450 may include some form of user notification mechanism to show device functionality or status, such as indicator lights, a speaker, or a display. User interface 450 may also include circuitry for converting data received from controller 430 into signals that may be used to operate the user notification mechanism. User interface 450 may also include one or more buttons for performing specific user operations such as device reset, device configuration clear, and/or device access set-up.

In operation, gateway 400 receives one or more content streams (e.g., DSTP streams) from a transceiver (e.g., transceiver 155 in FIG. 1). The one or more content streams include network configuration and control information for configuring gateway 400, which is provided to controller 430, either from local network interface 410 or data processor 420. Once the gateway 400 is configured using the network configuration and control information provided to controller 430, the data processor 420 processes the remaining content in the one or more content streams to generate a broadcast signal transport stream. In some embodiments, the data processor 420 may terminate one or more content streams so as to not include those content streams as part of the broadcast signal transport stream. The data processor 420 may further extract only certain content from the one or more content streams for inclusion in the broadcast signal transport streams while allowing passing other content without change and/or while excluding other content. The inclusion or exclusion of content is performed based on the management control information provided to controller 430.

The data processor 420 also includes encapsulating and formatting the IP packets in the one or more processed content streams into link layer packets as part of a broadcast stream based on a specific transport protocol, as described above. Further data processor 420 includes packet management or scheduling functions in order to convert the broadcast signal transport stream into a stream containing baseband data packets suitable for processing by an exciter (e.g., exciter 115 in FIG. 1). The encapsulation and packet management performed by data processor 420 may include mapping the packets in the processed content streams to packets included in the broadcast signal transport stream. The packet management or scheduling information used to generate a timing and management control stream as well as a preamble stream, as described above.

Figure 5:
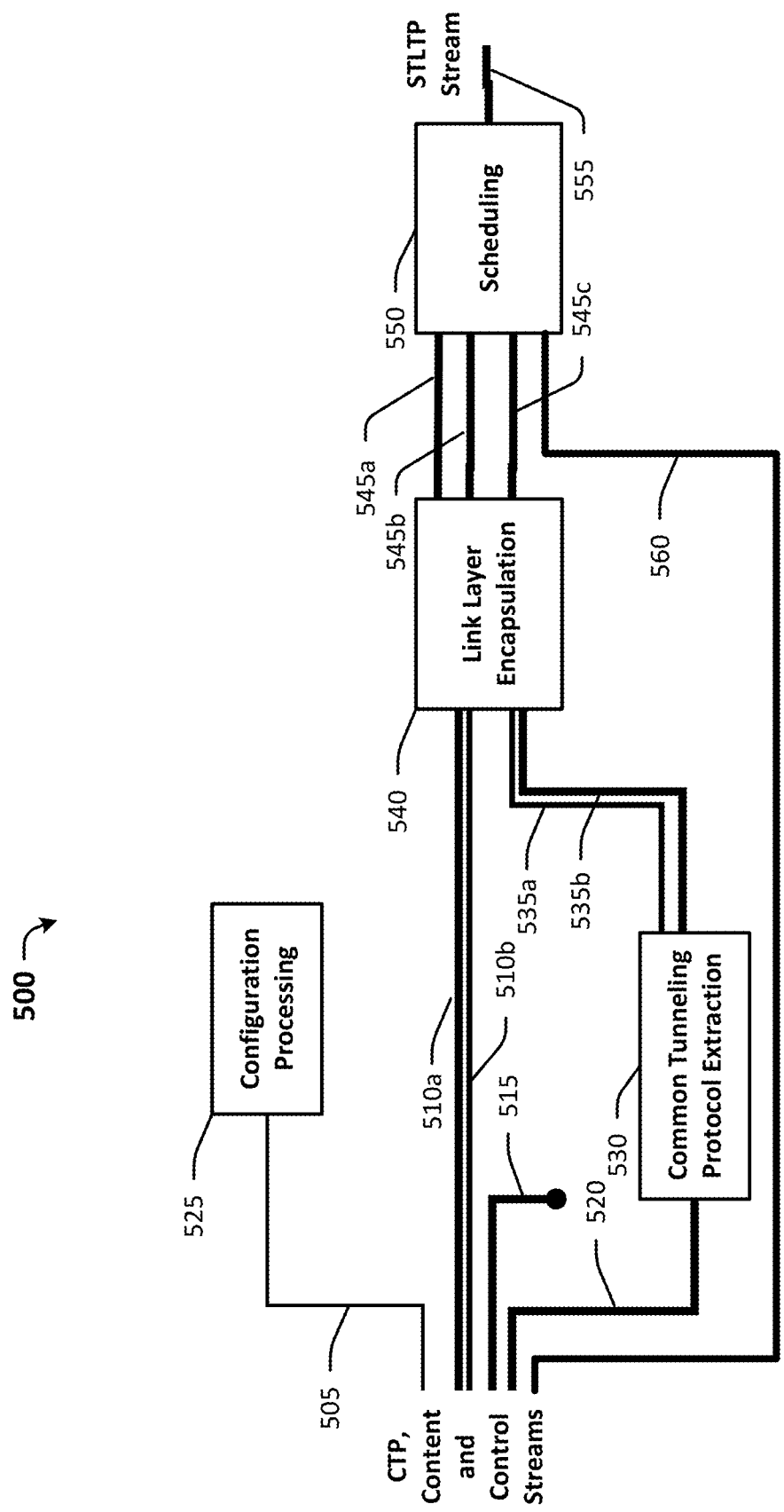
FIG. 5 is another exemplary signal diagram associated with the signal processing performed as part of a broadcast signal content distribution system according to aspects of the present disclosure.

FIG. 5 illustrates another exemplary signal diagram 500 associated with the signal processing performed as part of a broadcast signal content distribution system according to aspects of the present disclosure. Signal diagram 500 specifically illustrates various aspects of signal processing and management performed within a gateway or edge gateway device, such as gateway 400 described in FIG. 4 or gateway 160 described in FIG. 1. Signal diagram 500 illustrates the elements associated with an over the air broadcast signal and how the elements are processed, repackaged, and provided to other devices, such as an exciter, in the broadcast signal content distribution system. It is worth noting that some or all of the aspects of signal diagram 500 may equally apply to operation of other gateway devices that may perform similar operations and processing as gateway 200 as to operations in different configurations of broadcast content distribution systems. Further, signal diagram 500 will primarily be described with respect to the protocols associated with the ATSC 3.0 broadcast signal standard. It is worth noting some or all of the aspects of signal diagram 500 may be applicable to other broadcast signal standards including, but not limited to, those mentioned above.

In signal diagram 500, a set of CTP, content and control streams 505, 510a, 510b, 515, and 520 are provided to local network interface 410 in gateway 400 from a device that has previously processed the CTP streams (e.g., gateway 200 in FIG. 2). Stream 505 includes configuration information for gateway 400 and may be a tunneled DSTP stream arranged in a manner similar to tunneled DSTP stream 320 and passed through DSTP packet tunnel 335 in FIG. 3. Stream 505 may also be identified as a non-real time (NRT) stream or NRT ROUTE stream. The configuration information is provided to configuration processing 525 as part of controller 430. It is noted that more than one gateway may be present in a network so configuration data stream 505 may additionally include an addressing scheme to identify gateway 400 as the correct gateway. That configuration information includes mapping information regarding which of the streams to either ignore or pass on for encapsulation. The configuration information also defines the parameters for scheduling as well as the information necessary to construct the control functions in the STLTP stream for use by the exciter (e.g., exciter 165 in FIG. 1).

Following processing of the configuration information, data processor 420 begins identifying, routing, and processing of the remaining streams based on instructions from controller 430. CTP streams 510a and 510b are identified as streams that are routed directly to link layer encapsulation 540 with no additional processing. Streams 510a and 510b may or may not be tunneled DSTP streams and may carry media content that was originally transmitted for public use that is also to be included in the rebroadcast signal transmission. One or more of the streams may be multicast UDP/IP packet streams configured with DSTP. One of streams 510a and 510b may further include configuration information for a device further in the signal processing chain, such as exciter 165 is FIG. 1. Stream 515 is identified as a stream that will not be included in the re-broadcast signal and is terminated in gateway 400.

Stream 520 is identified as a stream containing media or data content specifically for inclusion in the re-broadcast signal. Stream 520 is a tunneled DSTP stream and may contain MMTP and/or ROUTE streams (e.g., MMTP stream 350 and/or ROUTE streams 360, 365, 370 passed through DSTP packet tunnel 375 in FIG. 3). Stream 520 is provided to common tunneling protocol extraction 530 as part of data processor 420. Following extraction, two processed content streams 535a and 535b are provided to link layer encapsulation 540. The content streams 535a and 535b may be referred to as the local content or regionalized content streams as these streams are only transmitted for use by the public or transmitted to other re-broadcasting facilities as part of the re-broadcast signal constructed by gateway 400 and its associated transmission elements. In some cases, these streams would replace ignored streams, such as stream 515. Additionally, ALP packet stream 560 is provided directly to scheduling 550, bypassing link layer encapsulation 540. ALP packet stream 560 may be used to replace one of the PLPs in the original broadcast transmission.

It is worth noting that streams 535a and 535b represent two different possible tunneled streams that are processed through common tunneling protocol extraction 530. Other streams, such as ALP packet stream 560, which may be passed through to the appropriate processing element, do not require processing through common tunneling protocol extraction 530. Although not shown, it is also possible to pass an STLTP stream through the system as a stream destined for an exciter. In such a case, the STLTP stream is provided directly to an exciter (e.g., exciter 165 in FIG. 1) bypassing both link layer encapsulation and scheduling 550. Any combination of tunneled streams may be processed in a manner similar to that described here.

Further, depending on the security protocols used, any CTP streams received by gateway 400 may be completely signed (i.e., all packets signed), partially signed (i.e., some packets signed), or not signed (i.e., no packets signed).

Link layer encapsulation 540 of streams 510a, 510b and processed DSTP streams 535a, 535b in data processor 420 may also include any mapping into PLPs as described above produces ALPPLP streams 545a, 545b, and 545c. These streams, along with ALP packet stream 560, are provided to scheduling 550 also included in processor 420 to produce an STLTP stream. The link layer encapsulation 540 and scheduling 550 are performed in data processor 420 based on instructions from controller 420.

As described above, if gateway 400 is signing the other packet streams using its local private key, it will generate a security packet stream using the public key of the exciter. The security packet stream will include rotating keys that allow an exciter device (e.g., exciter 165 in FIG. 1) to validate the signing of the other packet streams. The security design described by A/324 allows any or all the packets within the STLTP streams to be signed. If signed, each packet will contain an RTP header extension with an encrypted signature for the packet.

It is worth noting that although transceiver 200 and gateway 400 and their operations are described as separate devices or components, in some embodiments, one or more elements and/or functions included in either transceiver 200 or gateway 400 may be included as part of the other device or component. In some embodiments, it may be possible to combine all the elements and functions into one device, referred to as a gateway receiver device.

Figure 6:
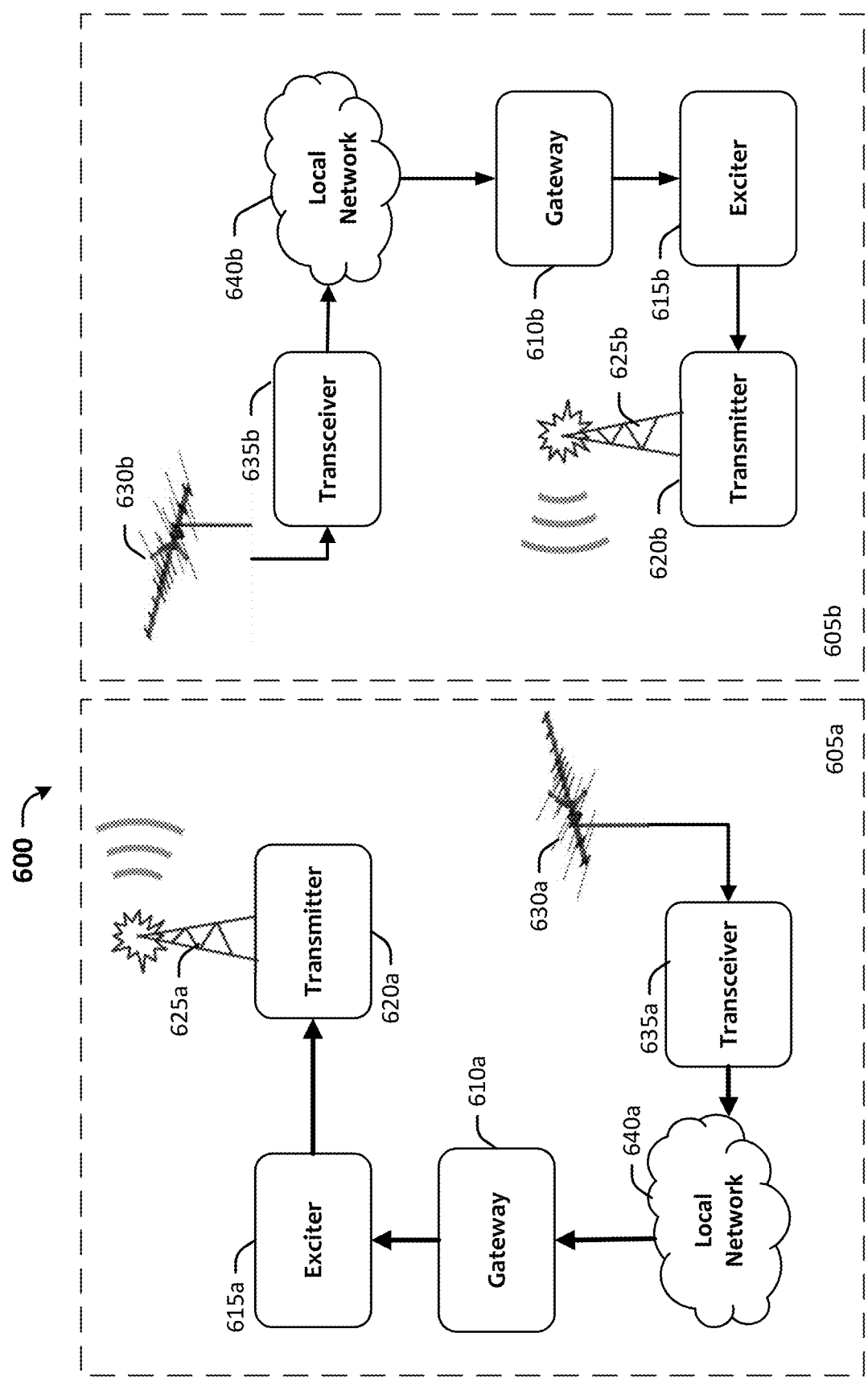
FIG. 6 is a block diagram of another exemplary, two-way broadcast content distribution system according to aspects of the present disclosure.

FIG. 6 illustrates a block diagram of another exemplary broadcast content distribution system 600 according to aspects of the present disclosure. Broadcast content distribution system 600 operates in a manner similar to the re-transmission configuration of broadcast content distribution system 100 described in FIG. 1. However, broadcast content distribution system 600 further includes the ability to operate in a full duplex communication mode between the two broadcast signal transmission arrangements or facilities that are geographically separated but within transmission and reception range of each other. Broadcast content distribution system 600 includes a first communication facility 605a and a second communication facility 605b that are at geographically separate locations. Each of communication facility 605a, b includes a receiver antenna 630a, b for receiving the transmitted broadcast signal from the other communication facility 605b, a. Each receiver antenna 630a, b is coupled to a transceiver 635a, b respectively. Each transceiver 635a, b is coupled to a local network 640a, b respectively. Each local network 640a, b is coupled to a gateway 610a, b respectively. Each gateway 610a, b is coupled to an exciter 615a, b respectively. Each exciter 615a, b is coupled to transmitter 620a, b respectively. Each transmitter 620a, b is coupled to a transmitter antenna 625a, b respectively. Each transmitter antenna 615a, b transmits a broadcast signal from its respective communication facility 605a, b to users in its geographic area such that the broadcast signal may also be received by the receiver antenna at the other communication facility 605b, a.

It is worth noting that, except as described below, the function and operation of receiver antenna 630a and 630b, transceiver 635a and 635b, gateway 610a and 610b, exciter 615a and 615b, transmitter 620a and 620b, and transmitter antenna 625a and 625b are similar to the function and operation of receiver antenna 150, transceiver 155, gateway 160, exciter 165, transmitter 170, and transmitter antenna 175 described in FIG. 1. Further, the addition of local network 640a and 640b permits communication between each of the communication facilities 605a and 605b and other equipment located within each of the communication facilities including, but not limited to, a content processing device (e.g., studio content processing system 105 described in FIG. 1). Further, gateways 610a and 610b may be embodied as either an edge gateway device, such as gateway 155, or a broadcast gateway device, such as broadcast gateway 110, depending on the type of operations (e.g., original transmission, re-transmission) that may be carried out at the communication facilities 605a and 605b.

In operation, each communication facility 605a and 605b may transmit their respective broadcast signals at different frequencies such that the frequency range of their respective transmission signals do not overlap. The two broadcast signals, one transmitted at a first frequency and the other transmitted at a second frequency, essentially connect the two Local Networks 640a and 640b. Packets destined for equipment in local network 640b may be sent through from local network 640a using a broadcast signal at the first frequency transmitted from communication facility 605a and received through communication facility 605b. Any packets that were sent in response to the packets originally sent may be sent through from local network 640b using a broadcast signal at the second frequency transmitted from communication facility 605b, received through communication facility 605a, and provided to local network 640a. One possible implementation to manage the two-way data communication may be to configure a separate subnet address for each of the local networks 640a and 640b. As a result, gateway 610a would identify and route packets addressed to the subnet address of Local Network 640b and vice versa. Each transceiver 635a and 635b, following the broadcast signal to IP signal conversion, forwards the appropriate packets to its respective local network 640a and 640b where the packets will be processed by the addressed equipment. It is worth noting that in some embodiments, based on a particular broadcast signal protocol, it may be possible for each communication facility 605a and 605b to transmit their broadcast signals using the same frequency and still operate in a manner as described here.

In some embodiments, the transmission of the two broadcast signals by communication facility 605a and communication facility 605b could be configured asymmetrically. For example, if communication facility included limited equipment, such as lower power transmitter 620a, such that it may only be capable of sending a limited amount of data, exciter 615a could be configured to operate using a narrower bandwidth transmission signal than the transmitted broadcast signal provided by facility 605b.

It is worth noting that, in some cases, the transmission and reception capability of communication facilities 605a and 605b form a full-duplex link. As a result, it may be possible to support transmission and reception of internet connection-based (TCP) protocols including Hypertext Transfer Protocol (HTTP) and File Transfer Protocol (FTP) through local networks 640a and 640b. Even if communication facilities 605a and 605b are also connected via fiber, copper, or other wireless wide area network (WAN) infrastructure, the duplex broadcast network formed by communication facilities 605a and 605b may provide an alternative or backup communication mechanism.

All gateway devices, whether configured as broadcast gateways, such as broadcast gateway 110 in FIG. 1, edge gateways, such as gateways 110a and 110b, are essentially IP routers. That is, they take or receive IP packets intended for ATSC 3.0 receivers (typically, multicast packets) via a data layer protocol, such as DSTP, add a data link layer (e.g., ALP), and send them on to the exciter as a baseband data transport stream, such as STLTP. A signal broadcast receiver reverses this process until it recovers a stream of IP packets which it then uses to access the various content being broadcast.

Many broadcast standards do not place constraints on the formulation or arrangement of IP packets except to maybe define an identification mechanism. For instance, in the ATSC 3.0 broadcast standard, identification mechanism includes defining the initial low-level signaling (LLS) multicast address and port. Therefore, it is possible to allow any type or number of IP packets to be passed through a broadcast gateway, such as broadcast gateway 110. However, having many disparate IP packets with separate addressing within the same PLP alongside actual ATSC 3.0 transport multicast packets may cause performance issues for consumer-grade broadcast receivers. Instead, the gateway device may be configured to place some or all of the general-purpose IP packets on one or more PLPs that are separate from the other broadcast signaling and content. The general-purpose IP packets, in their own PLP(s) may be broadcast along with other broadcast signaling and content.

However, since broadcast signal transmission is sometimes unreliable, it may be useful to provide error correction at the IP layer as well as at the PHY layer. Further due to the nature of broadcast signal transmission and receipt, there is also the possibility of man-in-the-middle security attacks so including an option to add security at the IP layer may also prove beneficial.

In some embodiments using ATSC 3.0 as the broadcast signal transmission standard, the general-purpose tunneling protocol (GPTP) may be used to extend the CTP defined in A/324 to provide a means to tunnel any type of IP packet for easy transmission and configuration using a gateway device, such as gateway 610a or 610b. Since gateway devices are generally configured to accept real-time transport protocol (RTP) multicast streams, a GPTP tunneling module may be included in a device, such as transceiver 635a and 635b prior to inputting the streams to the gateway device. The CTP forward error correction (FEC) functionality could be configured to support as much robustness as necessary in addition to the robustness configured for the PHY layer PLP.

Further, the CTP security additions described above could also be enabled for signing some or all the GPTP tunneled packets. The tunneling may additionally require a public/private key mechanism at the communication facility (e.g., communication facilities 605a and 605b). GPTP is designed to support the functionality though it is optional and may not be used. However, since the key pairs could be dedicated to this application, they could be separate from any other Public Key Infrastructure (PKI) deployed and used as part of the original broadcast transmission for public use.

To accommodate applying the security mechanisms to the GPTP, the signature must be placed in an information header for the tunneled packet as has been described in A/324 for DSTP and ALPTP. The information header defined for GPTP may include the tunneled packet length and a flag indicating whether a signature is included or not. The packet length is included so that the GPTP tunneling function need not understand the underlying packet structure. If the signature flag is set, two additional fields are included to contain the signature and the key number used to generate it. An exemplary format of an information header for a GPTP tunneled packet is shown below in table 2.

TABLE 2

| Syntax | No. of Bits | Format |
| --- | --- | --- |
| information_header( ) { | | |
|    length | 16 | uimbsf |
|    signed_flag | 1 | bslbf |
|    reserved | 11 | '00000000000' |
|    if ( signed_flag == '1' ) { | | |
|       key_num | 4 | uimbsf |
|       GMAC_tag | 128 | uimbsf |
|    } | | |
|    else { | | |
|       reserved | 4 | '0000' |
|    } | | |
| } | | | length shall indicate the length of the tunneled packet in bytes starting immediately after the last byte GPTP Tunneled Packet Header; signed_flag shall indicate that the tunneled packet and its associated information header are signed. The key_num and GMAC_tag fields are included in the information header if signed_flag is '1';

key_num shall indicate the index number of the GCM key used in authentication of the packet. It shall have a value in the range from 0x0 through 0x4. A value of 0x0 shall indicate that no authentication processing is applied. Values from 0x1 through 0x4 shall indicate that authentication processing is applied using the key having the index number given. Values 0x5 through 0x7 shall be reserved; and GMAC_tag shall be the 128-bit GMAC_tag calculated for the packet using a combination of the key value indicated by the key_num field, the initialization value determined as described A/324 Section 9.4.1, and the GHASH function applied to the structural elements including the Tunneled Packet Information Header with the GMAC_tag field set to zeroes plus the tunneled packet.

Figure 7:
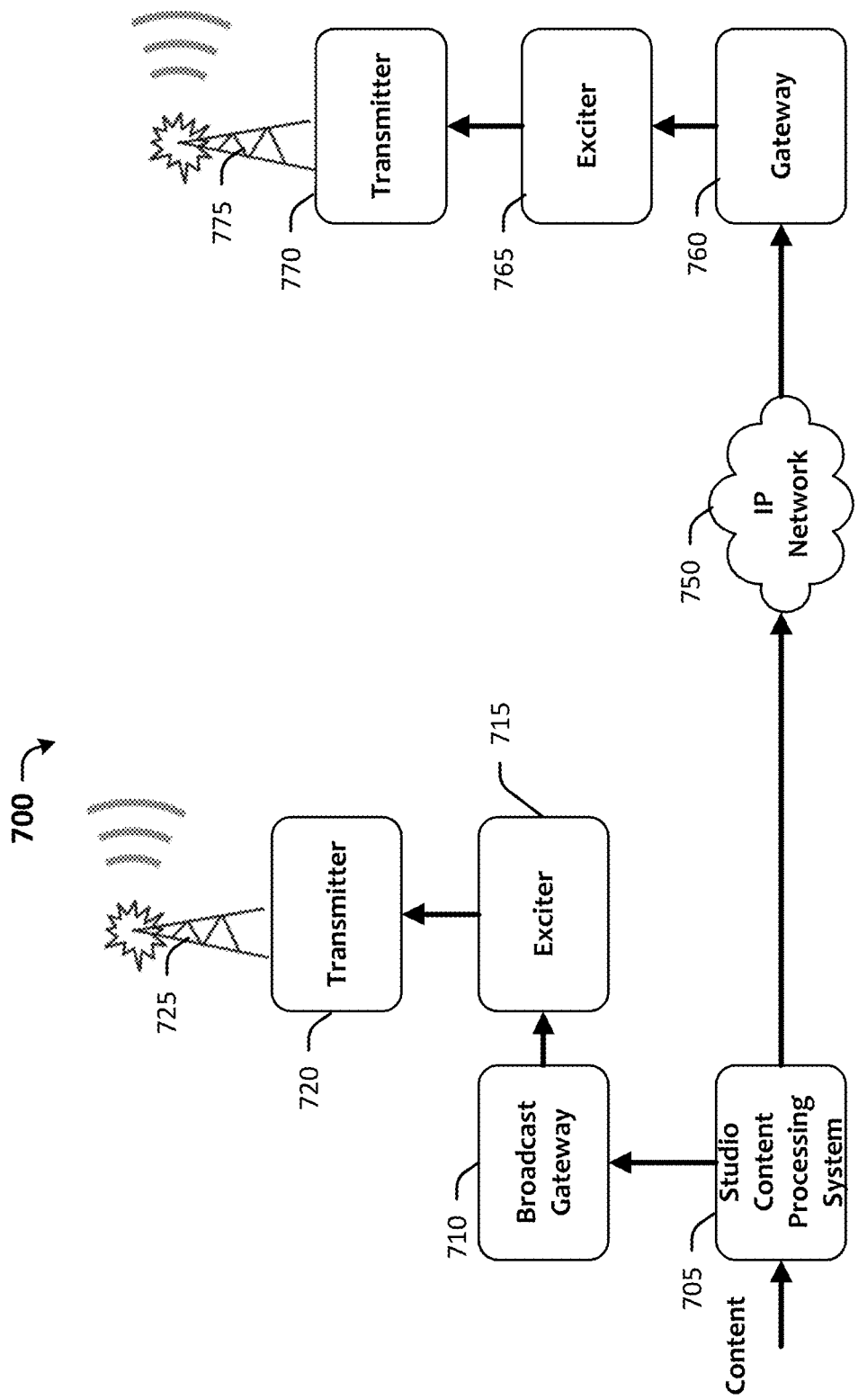
FIG. 7 is a block diagram of a further exemplary broadcast content distribution system according to aspects of the present disclosure.

FIG. 7 illustrates a block diagram of a further exemplary broadcast content distribution system 700 according to aspects of the present disclosure. Broadcast content distribution system 700 represents an alternative configuration of a re-transmission system. The transmitter 720 is configured as the main or original transmission source of a broadcast signal. However, instead of relying on receiving the transmitted broadcast signal to generate the new broadcast signal for re-transmission, broadcast content distribution system 700 uses a wide area IP network or WAN to provide the content streams from studio content processing system 705 to a gateway device 760. Gateway device 760 operates in a manner similar to gateway device 160 described in FIG. 1 or in a manner similar to gateway device 400 described in FIG. 4.

In broadcast content distribution system 700, content from one or more content sources is provided to studio content processing system 705. Studio content processing system 705 is coupled to broadcast gateway 710. Broadcast gateway 710 is coupled to exciter 715. Exciter 715 is coupled to transmitter 720. Transmitter 720 is coupled to the transmitter antenna 725, which radiates the broadcast signal provided through transmitter 720 into the airwaves. Studio content system 705 is also coupled through various network elements in IP network 750 to gateway 760. Gateway 760 is coupled to exciter 765. Exciter 765 is coupled to transmitter 770. Transmitter 770 is coupled to the transmitter antenna 775, which radiates the broadcast signal provided through transmitter 770 into the airwaves. Nominally, the studio content processing system 705, broadcast gateway 710, exciter 715, transmitter 720, and antenna 725 are collocated (e.g., in the same building or facility) and represent a broadcast signal transmission mechanism for delivering broadcast signals for use by the public within a first geographic area. Further, gateway 760, exciter 765, transmitter 770, and transmitter antenna 775 are also collocated at a geographic location that is different from the location of the elements mentioned above and may represent a broadcast signal transmission mechanism for delivering broadcast signals for use by the public within a second or different geographic area. Except as described below, studio content processing system 705, broadcast gateway 710, exciter 715, transmitter 720, transmitter antenna 725, gateway 760, exciter 765, transmitter 770, and transmitter antenna 775 operate and function in a manner similar to those similarly numbered elements in FIG. 1 and will not be described in further detail here.

As described above, studio content processing system 705 generates content streams representing media content and data content. One or more of the content streams may include configuration data for a gateway other than broadcast gateway 710, such as gateway 760, in order to facilitate a re-transmission of a new broadcast signal that represents a modified version of the broadcast signal transmitted by transmitter 720 through antenna 725. The one or more content streams generated by studio content processing system 705, including the content stream(s) that include configuration data for gateway 760, are provided to gateway 760 through IP network 750. The gateway 760 processes the one or more content streams to extract the necessary configuration data, in some form of gateway network configuration and control information as described above, and constructs a broadcast signal transport stream (e.g., an STLTP stream). Depending on the configuration data, the broadcast signal transport stream constructed by gateway 760 may be different from the broadcast signal transport stream generated by broadcast gateway 710, as has been described above.

In some embodiments, gateway 760 may further validate any secure incoming content streams from studio content processing system 705. However, as described above, gateway 760 does not contain private keys and would not sign the resulting broadcast signal transport stream provided to exciter 765 thus precluding the need for a private key to sign the STLTP data. Note there is still a private key needed to validate the security information, but this is used in the same way as an Exciter processing an STLTP stream.

As described above, one or more of the present embodiments may be used to address issues with localized delivery of emergency alerts in conjunction with an EAS, such as alerts for dangerous weather, missing persons, or emergencies or disasters. The present embodiments may be used in addition, or in place of, the present EAS alert distribution mechanism by providing the ability to customize various data streams and localize the emergency information to the necessary transmissions. EAS alert content typically requires a minimum of a text caption in the video and a corresponding audio description of the emergency event. This separate video stream could be created, perhaps at a lower resolution or bandwidth, and targeted at the specific transmission site. In addition, the present embodiments may be more suited to handle more difficult situations involving several different emergency events where each event may be targeted at overlapping geographic areas.

In one example, a failure may occur when the physical communication network connecting one or more of local EAS ENDECs with the broadcast studio or facility fails. The present embodiments may be used to create a full duplex network over the broadcast content distribution system, similar to that described for broadcast content distribution system 600 in FIG. 6, that is capable of bridging over the failed portion of the physical communication network and restoring EAS operation to any affected areas. Details regarding different physical configurations of a broadcast content distribution system including a plurality of networked broadcast transmission facilities utilizing one or more aspects of the present embodiments will be described below.

Figure 8:
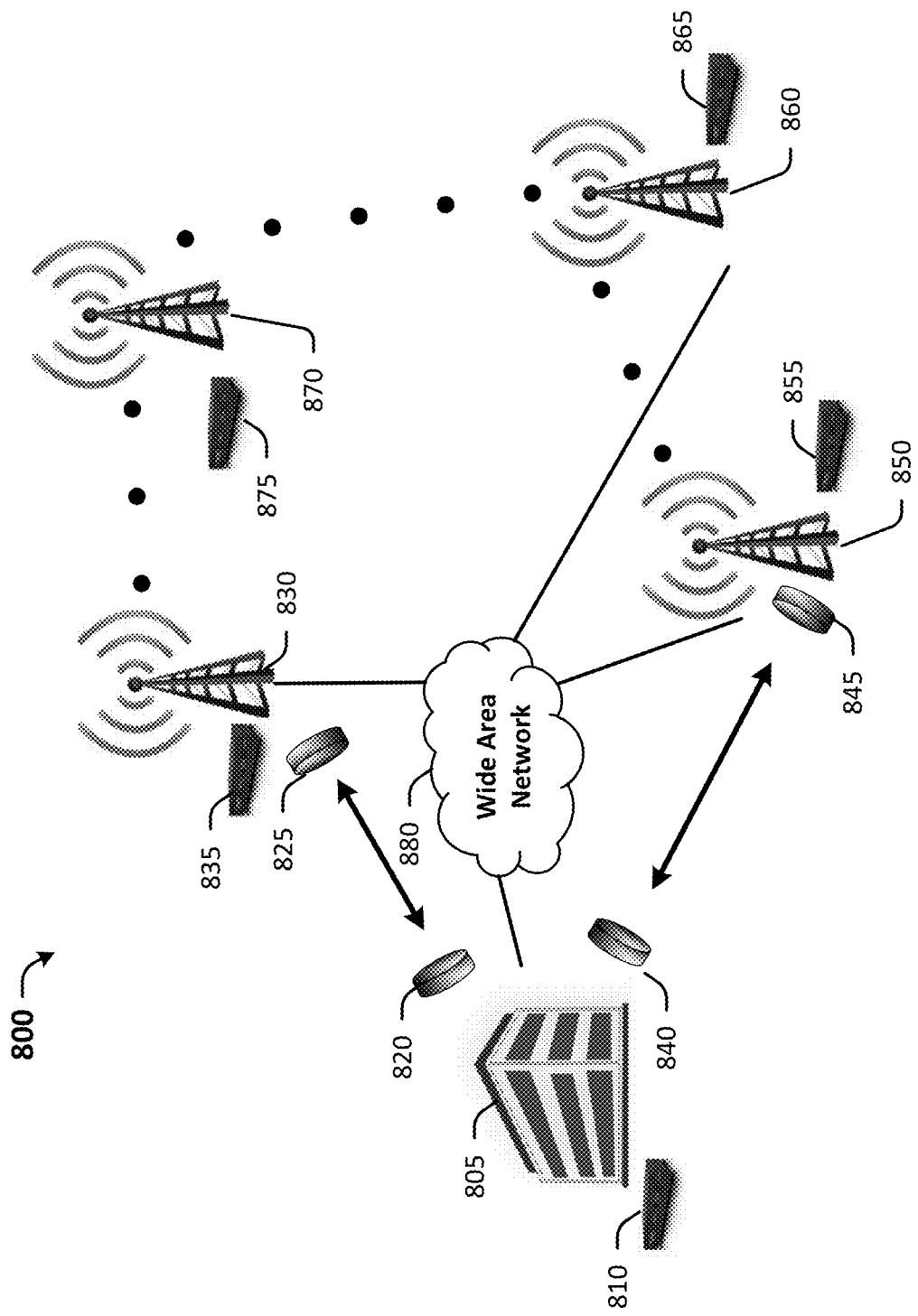
FIG. 8 is a block diagram of yet another exemplary broadcast content distribution system according to aspects of the present disclosure.

FIG. 8 illustrates a block diagram of yet another exemplary broadcast content distribution system 800 according to aspects of the present disclosure. Broadcast content distribution system 800 represents a configuration of a multi-mode broadcast content distribution system. The studio content processing (e.g., studio content processing system 105 in FIG. 1) is performed in a studio content processing facility that is located remote from a first broadcast transmission facility and a second broadcast transmission facility. The three facilities are communicatively linked together through at least two different communication links. Further, broadcast transmission facility and broadcast transmission facility may be linked to other transmission facilities through one or more communication links, including a broadcast transmission communication link. It is important to note that broadcast content distribution system 800 employs a number of different communication links between the studio content processing facility as well as the broadcast transmission facilities, along with using aspects of the present embodiments, in order to provide a more robust and redundant environment that can provide uninterrupted operation. However, in other broadcast content distribution systems, more, or fewer, or different communication links may be present.

In broadcast content distribution system 800, content from one or more content sources is processed in studio content processing facility 805 and provided as broadcast content to broadcast transmission facility 830 and broadcast transmission facility 850. The broadcast content may be provided to both broadcast transmission facility 830 and broadcast transmission facility 850 through wide area network 880. Alternatively, broadcast content may be provided using microwave transceiver 820, located at studio content processing facility 805, and microwave transceiver 825, located at broadcast transmission facility 830. Further, broadcast content may alternatively be provided using microwave transceiver 840, located at studio content processing facility 805, and microwave transceiver 845, located at broadcast transmission facility 850. Broadcast communication facility 860, is also communicatively coupled to studio content processing facility 805, broadcast transmission facility 830, and broadcast transmission facility 850 through wide area network 880. Broadcast communication facility 860 may also be communicatively coupled to broadcast communication facility 850 through a broadcast communication link. Broadcast communication facility 870 may be communicatively linked to either one or both of broadcast communication facility 830 and broadcast communication facility 860 only through a broadcast communication link. Studio content processing facility 805 also includes EAS ENDEC 810, which may be coupled into wide area network 880 as well as interfaced into the operation of studio content facility 805. Broadcast communication facility 830 also includes EAS ENDEC 835, which may be coupled into wide area network 880 as well as interfaced into the operation of Broadcast communication facility 830. Broadcast communication facility 850 also includes EAS ENDEC 855, which may be coupled into wide area network 880 as well as interfaced into the operation of broadcast communication facility 850. Broadcast communication facility 860 also includes EAS ENDEC 865, which may be coupled into wide area network 880 as well as interfaced into the operation of broadcast communication facility 860. Broadcast communication facility 870 also includes EAS ENDEC 875, which is interfaced into the operation of broadcast communication facility 870 but is not shown coupled into wide area network 880 and may instead be stand alone or interfaced into another wide area network.

It is important to note that studio content processing facility 805, broadcast communication facility 830, broadcast communication facility 850, broadcast communication facility 860, and broadcast communication facility 870 are each at different geographic locations. Further, as shown, broadcast communication facility 830 and broadcast communication facility 850 are geographically separated by such a distance that broadcast communication between them is not feasible.

The studio content processing facility may include one or more studio content processing devices similar to studio content processing system 105 described in FIG. 1 or studio content processing system 705 described in FIG. 7. The one or more studio content processing systems may process the studio content in a manner as described above and provide the content as one or more IP streams over the wide area network 880. The studio content processing facility may also include one or more broadcast gateways similar to broadcast gateway 110 in FIG. 1 or broadcast gateway 710 in FIG. 7. The one or more broadcast gateways receive content streams from the one or more studio content processing systems and format the content streams into broadcast signal transport streams for delivery over the microwave links through microwave transceivers 820 and 840.

Each of broadcast communication facility 830, broadcast communication facility 850, broadcast communication facility 860, and broadcast communication facility 870 includes an exciter similar to exciter 115 in FIG. 1, a transmitter similar to transmitter 120, and a transmitter antenna similar to transmitter antenna 125. Further, broadcast communication facility 830 and broadcast communication facility 850 also include a microwave transceiver 825 and microwave transceiver 845 respectively. In some embodiments, one or more of the broadcast communication facilities may further include a receiver antenna similar to receiver antenna 150, a transceiver similar transceiver 155, and a gateway device similar to gateway device 160. Additionally, in some cases, the broadcast communication facilities may configure the EAS ENDECs to regionalize the messages processed for emergency events based on the geographic areas covered by the broadcast communication facilities. As a result, each EAS ENDEC shown in broadcast content distribution system 800 must have the ability to communicate with the studio content processing facility 805 so that the studio content processing facility 805 can produce and provide audio and video content with the regionalized emergency event information embedded.

In some embodiments, broadcast communication facility 850 and broadcast communication facility 860 may be communicatively coupled to the studio content processing facility 805 through wide area network 880 using a high-speed data connection, such as a one gigabit per second (Gb/s) fiber connection. Broadcast communication facility 850 also has a duplex microwave link, through microwave transceiver 845, to studio content processing facility 805, through microwave transceiver 840, for backup communication purposes. The broadcast signal transmission frequency, as well as the geographic coverage area, of broadcast communication facility 850 is different from broadcast communication facility 860. However, the broadcast signal transmitted by broadcast communication facility 850 is receivable using a receiver antenna at broadcast communication facility 860 and, similarly, the broadcast signal transmitted by broadcast communication facility 860 is receivable using a receiver antenna at broadcast communication facility 850. In addition, EAS ENDEC 855 is connected back to studio content processing facility 805 using the same high speed data connection through wide area network 850.

A broadcast gateway at studio content processing facility 805 generates and provides a broadcast signal transport stream (e.g., STLTP) to broadcast communication facility 850 either over the high-speed data connection through wide area network 880 or via the microwave communication link using microwave transceivers 840 and 845. The broadcast signal transport stream includes additional data specifically for transmission by broadcast communication facility 860. The broadcast signal transport stream is processed and transmitted by broadcast communication facility 850. The processing includes providing the content specific for transmission by broadcast communication facility 860, along with the necessary timing control and management data, in one or more content streams (e.g., DSTPs) as described above. The transmitted signal is received by a receiver antenna and processed by a transceiver and gateway device at broadcast communication facility 860.

It is worth noting that since both broadcast communication facility 850 and broadcast communication facility 860 are connected to studio content processing facility 805 through wide area network 880 over a high speed data connection it is possible to for studio content processing facility 805 to generate and provide two broadcast signal transport streams for broadcast communication facility 850 and broadcast communication facility 860, respectively, each with the same or nearly the same content but different signaling. However, providing the two baseband packet streams would require nearly twice the data bandwidth. Further, in the event that communication over wide area network 880 is interrupted, the broadcast signal transport stream, including the content specific for transmission by broadcast communication facility 860, may still be provided to broadcast communication facility 850 using the microwave link as described above. If necessary, the gateway device broadcast communication facility 860 may be configured to detect the loss of traffic over the wide area network 880 and begin receiving and processing the transmission from broadcast communication facility 850. It may also be possible to synchronize the content received over the wide area network with the expected emission time of the broadcast transmission content from broadcast communication facility 850 to mitigate or eliminate interruption of broadcast transmission content from broadcast communication facility 860.

Any emergency events detected by EAS ENDEC 810 may be inserted into the secondary video and audio service portion of the broadcast signal transport stream at the studio content processing facility 805 to send along with associated signaling that includes the AEAT. The primary audio and video content stream without the EAS event information continues to be produced and is signaled for transmission by broadcast communication facility 860. In this case, the transmission that can be received by the public viewers in the geographic area covered by broadcast communication facility 850 will contain the EAS event information and the rest of the network, including the transmission by broadcast communication facility 860 will not. The same signaling configuration may be performed for any individual emergency event that covers a different geographic area throughout the network.

If EAS ENDEC 865 detects an emergency event, EAS ENDEC 865 sends the emergency event information to the studio content processing facility 805 over the wide area network 880. If communication over the wide area network has been interrupted, EAS ENDEC 865 may provide the emergency event information to the gateway device in broadcast communication facility 860. The gateway device may package the emergency event information for transmission with signaling to be received and processed by broadcast communication facility 850 by utilizing full duplex IP communication mode similar to that described above in FIG. 6. The broadcast communication facility 850 may provide the received emergency event information to studio content processing facility 805 either over wide area network 880 or through the microwave communication link. Alternatively, a receiver antenna and transceiver, similar receiver antenna 150 and transceiver 155 described in FIG. 1, may be included studio content processing facility 805 if the facility is within reception range of the broadcast from broadcast communication facility 860. The studio content processing facility 805 processes the emergency event information for inclusion in the broadcast signal transport stream provided to broadcast communication facility 850.

In some embodiments, broadcast communication facility 850 is communicatively coupled to the studio content processing facility 805 through wide area network 880 using a high-speed data connection while broadcast communication facility 860 is communicatively coupled through wide area network using a low speed data connection such as a 100 kilobit per second (kb/s) Category 5 (CatV) copper connection. Further, EAS ENDEC 855 and EAS ENDEC 865 communicate with the studio via the high speed and low speed data connections, respectively. Due to the inability to provide information between studio content processing facility 805 and broadcast communication facility 860 via a high-speed data connection, content streams (e.g., DSTPs) are provided to both broadcast communication facility 850 and broadcast communication facility 860, each utilizing a gateway device similar to gateway device 160 described in FIG. 1. Further, receiver antennas and transceivers, similar to receiver antenna 150 and transceiver 155 described in FIG. 1, would also be included at both broadcast communication facility 850 and broadcast communication facility 860 allowing the facilities and associated EAS ENDECs 855 and 865 to communicate if communication over wide area network 880 was interrupted. Since content streams are being provided to broadcast communication facility 850 and broadcast communication facility 860, only a separate signaling content stream would be carried for each facility with the content stream specific to broadcast communication facility 860 being transmitted as part of the broadcast-by-broadcast communication facility 850. The main audio and video content streams may be the same for both facilities.

At the onset of an emergency event, the particular EAS ENDEC 855 or EAS ENDEC 865 would communicate with the studio either through the physical fiber/copper network or, if that was unavailable, through the combination of the broadcast IP network and the microwave link between the broadcast communication facility 850 and studio content processing facility 805 as described above. Note that at least two different multicast content streams may be sent over the microwave link between broadcast communication facility 850 and studio content processing facility 805, one containing signaling for the broadcast signal transmission by broadcast communication facility 850 and the other containing content and signaling for the broadcast signal transmission by broadcast communication facility 860. An additional audio and video content stream may be created for the geographic area covered by either one or both of broadcast communication facility 850 and broadcast communication facility 860 if an emergency event occurs and is detected at either EAS ENDEC 855 or EAS ENDEC 865.

In some embodiments, broadcast communication facility 830 may be communicatively coupled to broadcast communication facility 870 as a broadcast transmission single frequency network (SFN). An SFN is a broadcast network where several transmitters simultaneously transmit the same signal over the same frequency channel. Broadcast communication facility 830 is communicatively coupled to the studio content processing facility 805 through wide area network 880 using a high-speed data connection. Broadcast communication facility 870 is controlled through the signal transmitted by broadcast communication facility 830 using the mechanisms described above. A gateway device is included at broadcast communication facility 830 and receives the various content streams (e.g., DSTPs) from studio content processing facility 805 over the wide area network 880. The gateway device is used to create both the broadcast signal transport stream (e.g., STLTP) to control the exciter at broadcast communication facility 830 and additionally create the broadcast signal transport stream to control the exciter at broadcast communication facility 870. As described above, it is possible by using a tunneling protocol, such as CTP, to transport any format data stream, including a baseband packet stream, or STLTP, as a content stream, or DSTP. Further, the latter broadcast signal transport stream may be contained in its own PLP that may be private or unpublished in order to isolate it from other data content destined for public viewing in the geographic area covered by broadcast communication facility 830. The latter broadcast signal transport stream would be broadcast as part of the signal transmission from broadcast communication facility 830 and received by broadcast communication facility 870 through a receiver antenna and transceiver similar to receiver antenna 150 and transceiver 155 described in FIG. 1. The extracted broadcast signal transport stream is processed in a gateway device at broadcast communication facility 870 and provided to the exciter for transmission at the same frequency.

EAS ENDEC 835 at broadcast communication facility 830 may communicate any received emergency event information to the studio content processing facility 805 either over the wide area network 880 or over the microwave link formed by microwave transceivers 820 and 825. EAS ENDEC 875 may communicate any received emergency event information only to broadcast communication facility 830 by utilizing full duplex IP communication mode similar to that described above in FIG. 6. However, in some cases it might be less expensive to have a separate emergency backup communication device (not shown) included at broadcast communication facility 870 allowing a regionalized emergency alert message to be transmitted with default video and audio by broadcast communication facility 870.

In some embodiments, broadcast communication facility 870 may not be communicatively coupled to any other broadcast facilities except to broadcast communication facility 860 utilizing a full duplex IP broadcast communication mode similar to broadcast content distribution system 600 described in FIG. 6. The gateway device at broadcast communication facility 860 receives content streams from studio content processing facility 805 either over wide area network 880 (e.g., using a high-speed data connection if available) or through reception of the broadcast signal transmitted by broadcast communication facility 850. The signaling content streams needed for controlling broadcast communication facility 870 would be processed by the gateway device at broadcast communication facility 860 and included in its broadcast transmission. The transmitted signal is received at broadcast communication facility 870 and processed to extract the signaling content streams for producing and transmitting the broadcast signal broadcast communication facility 870. It is important to note that in some cases, the content streams produced and provided by the studio content processing facility 805 may include signaling for controlling the transmission of a broadcast signal by broadcast communication facility 850 containing content streams that include signaling for controlling the transmission of a broadcast signal by broadcast communication facility 860, further containing content streams that include signaling for controlling the transmission of a broadcast signal by broadcast communication facility 870.

EAS ENDEC 875 may communicate any received emergency event information only to broadcast communication facility 860 using the full duplex mode described above. Broadcast communication facility 860 may communicate the emergency event information received from broadcast communication facility 870 back to the studio content processing facility 805 either directly over the wide area network 880 or indirectly using full duplex IP broadcast communication mode with broadcast communication facility 850. If alternate audio and video streams are required for transmission by broadcast communication facility 870 (e.g., to show the EAS crawl and audio description for the emergency event), the additional audio and video content that could be included in the content stream that includes the signaling for broadcast communication facility 870 replacing the original or main audio and video content.

The inclusion of a gateway device, such as gateway 760 in FIG. 7 or gateway 160 in FIG. 1, in a broadcast content distribution system enables additional capabilities that are not available when information is only delivered as a physical layer transport stream (e.g., an STLTP stream). One such capability is to provide information storage in conjunction with the gateway device that may accumulate video and audio along with secure signaling and application data that can be used in the event of an emergency where all communication networks fail. Such a capability may be referred to as an emergency backup service (EBS). The storage supporting the service resides at the transmitter site that includes the gateway device. Depending on the requirements, the storage may be large enough to save a relatively long segment audio and video content as well as supporting signaling and application data. The stored content may be updated on a regular basis so that any signatures associated with the content would not expire. The EBS is configured to activate when incoming communication over the network (e.g., through transmitter 120 in FIG. 1 or over IP network 750 in FIG. 7) is interrupted. The EBS may be configured to retrieve the stored content memory. The stored content is processed and converted in the gateway device to form one or more DSTP streams emulating the streams normally sent over the network and can be repeatedly provided from the gateway device to the exciter (e.g., exciter 765) for broadcast transmission as a loop. The signaling associated with the stored content, including the Media Presentation Description (MPD), would remain static but valid, having been signed at the origination point. The stored content is processed and converted in the gateway device to form one or more DSTP streams emulating the streams normally sent over the network. The configuration of the gateway device would remain constant.

In some embodiments, the video and audio content may provide information to users regarding the loss of communication and where to tune to get more information. If a user application were provided, the application may be run on broadcast receivers supporting the interactive environment and, if available, connect to the internet via a functional network to report back to the broadcast source (e.g., studio content processing system 705 in FIG. 7 or studio content processing system 105 in FIG. 1) that the transmitter communication connection has been lost. It is worth noting that in a serious emergency, many of the broadcast receivers in a geographic area covered by the broadcast transmission might not have internet access but only one is needed to report the transmitter communication connection failure to the source broadcaster.

In another embodiment, if an ENDEC, such as ENDEC 875 in FIG. 8, were collocated and/or communicating with the EBS, the ENDEC could provide EAS emergency event information for storage. It is important to note that certain emergency event information provided by the ENDEC, such as the advanced emergency alert table (AEAT), may not be able to be included in the EBS generated broadcast signal directly because it would not be signed but could be provided as a separate private data stream which could then be provided to the application in the broadcast receiver and displayed as audio and video information. A public key mechanism may alternatively be used to sign the AEAT for inclusion in the EBS generated broadcast signal.

It is worth noting that the EBS may provide viable video and audio content in a continuous broadcast signal loop until the signing information on the signaling expires. Further, some broadcast receivers may continue to play the video even though the signaling signing expired. The EBS would typically not be capable of signing any of the signaling due to the risk of having a resident private key in an unattended site. However, if such risk were acceptable, a complete signaling and application signing system may be included and deployed as part of the EBS.

As an example of how such an emergency backup system would work and referring again to FIG. 8, broadcast transmission facility 830 includes a signal transmitter with a 50-mile radius transmission footprint. The broadcast transmission facility 830 communicates with studio content processing facility 805 located 10 miles away through a microwave signal link using microwave transceiver 820 and microwave transceiver 825. Further, broadcast transmission facility 830 includes a local electrical energy generator (not shown) capable of operating the facility for 12 hours. During normal operation, the microwave signal link provides content, including DSTP streams, from the studio content processing facility 805 to the broadcast transmission facility 830, which combines the DSTP streams into the STLTP stream using the gateway device at broadcast transmission facility 830. In addition to the DSTP data streams containing the content intended for immediate broadcast, one or more of the DSTP streams also contains 5 minutes' worth of off-line audio and video content for each service in the broadcast signal along with the appropriate signaling for broadcast transmission during a time when the microwave connection is off-line (e.g., when an emergency event has occurred). The audio and video content may be constructed in such a way to be continuously looped during broadcast transmission. The signaling would be essentially identical to the live signaling except for signaling regarding the off-line application. In some embodiments the off-line application for the broadcast receivers described above may also be sent along with the off-line content.

The off-line content along with the associated application are stored locally as part of the EBS, either in the gateway device or in some external server memory at broadcast transmission facility 830. Once all the backup information is received, the EBS may be enabled to begin retrieving and providing the backup information as separate DSTP streams for processing in a gateway device as needed. It is worth noting that the EBS may constantly provide the backup DSTP streams to allow an immediate switchover if the gateway device detects a failure of the primary network path (e.g., the microwave link).

At a certain point in time, a hurricane hits the geographic area covered by broadcast transmission facility 930, causing a general power outage in the area and damaging the microwave transceiver 825. The local electrical energy generator is started allowing the transmitter at broadcast transmission facility 830 to continue operating. As a result of losing microwave signal reception due to the damaged microwave transceiver 825, the gateway device in broadcast transmission facility 830 begins providing backup information as a stream for broadcast transmission. Broadcast receivers with the 50-mile radius tuned to the services in the transmission will start receiving audio and video indicating that the broadcast is no longer live or some other information regarding the communication failure to the transmitter. In this case, the hurricane would have been forecast so a content stream pertinent to a hurricane emergency may have been uploaded to the EBS well before the event, with information on evacuation and contact information. The application associated with the backup information would also run on any broadcast receivers in the area capable of supporting the interactive content. If a few of these broadcast receivers still had access to the internet through some type of network connection, those broadcast receivers could report back to the studio content processing facility 805 that the application was running and that the backup content protocol had been activated. The broadcaster operating studio content processing facility 805 may then take steps to restore the microwave signal connection and power, if possible.

It is worth noting that the availability of a feature such as EBS may be important to some broadcasters and broadcast companies. As those broadcasters and broadcast companies move towards cloud infrastructure, with content and applications stored and accessed in the cloud, the ability to include a service such as EBS as part of the transmission facilities may be valuable as a backup system or in situations where internet connectivity may be less robust than typical microwave connections.

Figure 9:
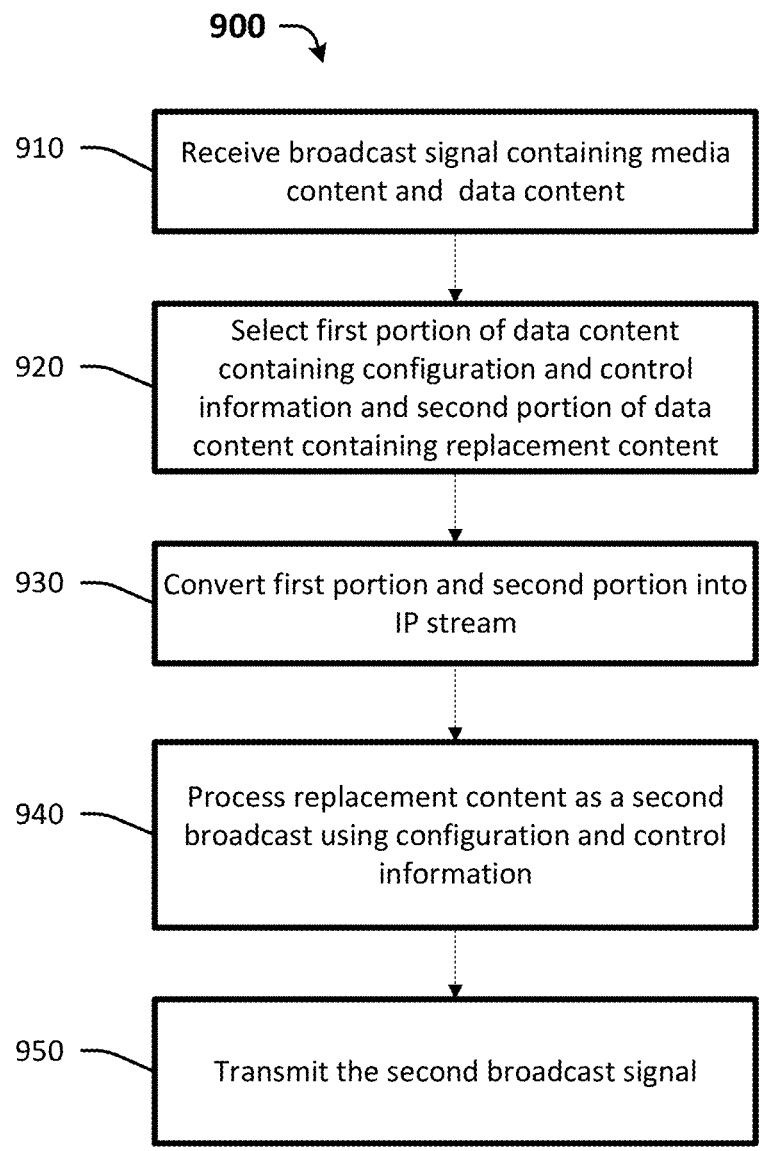
FIG. 9 is a flow chart of an exemplary process for providing alternative broadcast content in a heterogeneous broadcast content distribution system according to aspects of the present disclosure.

FIG. 9 illustrates a flow chart of an exemplary process 900 for providing alternative broadcast content in a heterogeneous broadcast content distribution system according to aspects of the present disclosure. Process 900 will be primarily described with respect to the broadcast content distribution system 100 described in FIG. 1. One or more aspects of process 900 may also be performed by various elements in broadcast content distribution system 600 described in FIG. 6, broadcast content distribution system 700 described in FIG. 7, or broadcast content distribution system 800 described in FIG. 8. Additionally, one or more aspects of process 900 may be performed by a transceiver device, such as transceiver device 155 described in FIG. 1 or transceiver device 200 described in FIG. 2, as part of a content distribution system. Further, one or more aspects of process 900 may be performed by a gateway device, such as gateway device 160 described in FIG. 1, gateway device 400 described in FIG. 4, or gateway device 700 described in FIG. 7, as part of a broadcast content distribution system. Although process 900 depicts steps performed in a particular order for purposes of illustration and discussion, the operations discussed herein are not limited to any particular order or arrangement. Further, while process 900 is described in association with an over the air broadcast content distribution system, process 900 may easily be adapted for use in other content distribution systems, such as a cable or satellite signal content distribution system and the like. Process 900 may also be used in conjunction with an EAS alert network system, such as described for broadcast content distribution system 800 in FIG. 8. One skilled in the art, using the disclosure provided herein, will also appreciate that one or more of the steps of process 900 may be omitted, rearranged, combined, and/or adapted in various ways.

At step 910, a broadcast signal is received at a broadcast signal transmission facility. The broadcast signal transmission facility that received the broadcast signal is at a different geographic location than the broadcast signal transmission facility that transmitted the broadcast signal. The broadcast signal is received by a transceiver circuit or device through a receiving antenna, such as transceiver 155 through receiver antenna 150. The broadcast signal contains media content for use by the public in the specific geographic region around the location of the broadcast transmission facility. In some embodiments, the media content may contain at least one of audio signals and video signals and is received from at least one source, the at least one source comprising at least one of a content distribution source, a broadcast content source and a content production studio.

The broadcast signal also contains data content. In some embodiments, the data content may be received from one of a media content listing and a content guide services listing. The broadcast signal may be compliant with a broadcast signal transmission standard that is used in the geographic region. In some embodiments, the broadcast signal is an ATSC 3.0 standard compliant broadcast signal.

At step 920, a first portion of the data content and a second portion of the data content received, at step 910, are selected out of the received broadcast signal. The selection, at step 920, is done as part of the tuning and demodulation function in a transceiver circuit or device, such as transceiver 155.

The first portion of the data content contains control and configuration information for use by the broadcast transmission facility and the second portion contains replacement media content specific to the geographic area covered by the broadcast transmission facility.

At step 930, the first portion of the data content and the second portion of the data content, selected at step 920 are converted into a multicast IP stream. In some embodiments, the multicast IP stream may be a DSTP stream. The specific content information may be media or data content that is intended only for transmission as part of a broadcast signal at the broadcast signal transmission facility that received the broadcast signal. For example, the specific content information may include localized emergency alert information or messages pertaining to a specific geographic region included as part of the geographic region covered by the broadcast transmission facility. Further, in some embodiments, the DSTP stream may include a security mechanism as part of an information header for at least one packet in the data source protocol stream. For example, the security mechanism may include a public-private key to sign one or both of the media content and data from the broadcast signal received, at step 910.

At step 940, the configuration and control information from the IP stream, converted at step 930, is used to process the replacement content from the IP stream for inclusion as part of a new or second broadcast signal. The processing, at step 940, may be performed in a gateway device, such as gateway 400 in FIG. 4. In some embodiments, the gateway device may be specifically configured as an edge gateway as described above. The processing may include providing the configuration and control information from the IP stream to controller 430 and the replacement content to the data processor 430 in gateway 400. The controller 430 provides instructions, based on the configuration and control information, to data processor 430 to process the replacement. In some embodiments, the processing may include mapping the internet protocol stream packets associated with the replacement content to broadcast signal transport protocol packets. The broadcast link packets may further be formed into a broadcast signal transport stream, such as an STLTP stream. In some embodiments, the configuration and control information is used to process the localized emergency alert information for inclusion in the new or second broadcast signal.

At step 950, the processed replacement content is transmitted as part of a new or second broadcast signal at the broadcast signal transmission facility that received the original or first broadcast signal, at step 910. The new or second broadcast signal is transmitted across the geographic region covered by the broadcast transmission facility using a transmitter device, such as transmitter 170 in FIG. 1, through a transmission antenna, such as transmitter antenna 175. The new or second broadcast signal may additionally include non-replacement content from the original or first broadcast signal, received at step 910. In some embodiments, the retransmission of the new broadcast signal, at step 940, may occur on a frequency that is different from the frequency used for the received broadcast signal. In other embodiments, such as when operating as part of an SFN, the retransmission of the new broadcast signal, at step 940, may occur on a frequency that is the same as the frequency used for the received broadcast signal.

One or more of the steps of process 900 may be modified or even omitted depending on a specific embodiment. For instance, step 950 may be omitted in cases where the second broadcast signal is not directly transmitted as part of the implemented process. Such an event may occur when the broadcast transmission facility serves as redistribution facility providing broadcast signals to other facilities over an alternate communication medium, such as microwave link or a wired communication network.

It is worth noting that although the above embodiments described above focus on physical hardware and elements located at facilities at specific geographic locations, the principles of the present disclosure may be easily extended to implementations that involve cloud-based operations for some of the processing and/or storage of content. For example, content streams, such as DSTP streams, and broadcast signal transport streams, such as STLTP streams, may originate either in the cloud or locally and various gateways or exciters throughout the network. The only limitations are bandwidth constraints for the network and ensuring that the security requirements associated with the broadcast standard can be maintained.

It is to be appreciated that, except where explicitly indicated in the description above, the various features shown and described can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for systems, apparatus, and methods for implementing secure television distribution over heterogeneous networks, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A method of providing a second broadcast signal from a first broadcast signal, comprising:
   receiving a first broadcast signal that is broadcast from a first transmitter, the first broadcast signal containing first displayable media content and data content that is non-displayable as part of the first broadcast signal, the first displayable media content and data content being encapsulated in at least one multicast internet protocol (IP) stream;
   extracting a first portion and a second portion of the data content that is non-displayable as part of the first broadcast signal from the at least one encapsulated multicast IP stream of the received first broadcast signal, the first portion containing control and configuration information and the second portion containing replacement media content;
   processing the second portion, using the first portion, to create a new set of encapsulated multicast IP streams for a second broadcast signal, the second broadcast signal including the replacement media content that is displayable as part of the second broadcast signal; and
   broadcasting, from a second transmitter, the second broadcast signal.

2. The method of claim 1, wherein the multicast IP stream is a data source transport protocol (DSTP) stream.

3. The method of claim 1, wherein the first displayable media content contains at least one of audio signals and video signals and is received from at least one source, the at least one source comprising at least one of a content distribution source, a broadcast content source and a content production studio.

4. The method of claim 1, wherein the data content is received from one of a media content listing and a content guide services listing.

5. The method of claim 2, wherein the DSTP stream includes a security mechanism as part of the header, wherein the security mechanism comprises a public-private key to sign at least one of the media content and data content and the first broadcast signal.

6. The method of claim 1, further comprising broadcasting the second broadcast signal on a frequency that is different from the frequency of the first broadcast signal.

7. The method of claim 1, wherein the first broadcast signal is an Advanced Television Systems Committee (ATSC) 3.0-compliant broadcast signal.

8. The method of claim 1, wherein processing the second portion includes mapping packets in the new set of the multicast IP streams to broadcast signal transport packets for the second broadcast signal.

9. A system comprising:
a transceiver that receives a first broadcast signal that is broadcast from a first transmitter, the first broadcast signal containing first displayable media content and data content that is non-displayable as part of the first broadcast signal, the first displayable media content and data content being encapsulated in at least one multicast IP stream, the transceiver further extracting a first portion and a second portion of the data content that is non-displayable as part of the first broadcast signal, wherein the first portion contains control and configuration information and the second portion contains replacement media content, the transceiver further processing the second portion, using the first portion, to create a new set of encapsulated multicast IP streams including the replacement media content that is displayable as part of a second broadcast signal;
a gateway device coupled to the transceiver, the gateway device processing the new set of encapsulated multicast IP streams to generate the second broadcast signal using the control and configuration information contained in the first portion; and
a second transmitter coupled to the gateway device, the second transmitter broadcasting the second broadcast signal.

10. The system of claim 9, wherein the multicast IP stream is a DSTP stream.

11. The system of claim 10, wherein the DSTP stream includes a security mechanism as part of the header, wherein the security mechanism comprises one of a public-private key to sign at least one of the media content and data content and the first broadcast signal.

12. The system of claim 9, wherein the second transmitter broadcasts the second broadcast signal on a frequency that is different from the frequency of the first broadcast signal.

13. The system of claim 9, wherein the first broadcast signal is an Advanced Television Systems Committee (ATSC) 3.0-compliant broadcast signal.

14. The system of claim 9, wherein the gateway further maps packets in the new set of multicast IP streams to broadcast signal transport packets.

15. The system of claim 9, wherein the gateway is an edge gateway.

16. A method of providing localized emergency alert information, comprising:
receiving a first broadcast signal that is broadcast from a first transmitter, the first broadcast signal containing first displayable media content and data content that is non-displayable as part of the first broadcast signal, the first displayable media content and data content being encapsulated in at least one multicast IP stream;
extracting a first portion and a second portion of the data content that is non-displayable as part of the first broadcast signal from the at least one encapsulated multicast IP stream of the received first broadcast signal, the first portion containing control and configuration information and the second portion containing replacement media content and localized emergency alert information for a specific geographic region;
processing the second portion, using the first portion, to create a new set of encapsulated multicast IP streams for a second broadcast signal, the second broadcast signal, the second broadcast signal including the replacement media content that is displayable as part of the second broadcast signal; and
broadcasting, from a second transmitter, the localized emergency alert information as part of the second broadcast signal using the control and configuration information contained in the first portion.

17. The method of claim 16, wherein the multicast IP stream is a DSTP stream that includes a security mechanism as part of the header, wherein the security mechanism comprises one of a public-private key to sign at least one of the media content and data content and broadcast signal.

18. The method of claim 16, further comprising broadcasting the second broadcast signal across the specific geographic region on a frequency that is different from the frequency of the first broadcast signal.

19. The method of claim 16, wherein the first broadcast signal is an Advanced Television Systems Committee (ATSC) 3.0-compliant broadcast signal.

20. The method of claim 16, wherein processing the localized emergency alert information includes mapping packets in the new set of multicast IP streams to broadcast signal transport packets for the second broadcast signal.

* * * * *